(12) United States Patent
Bartlett, II et al.

(10) Patent No.: US 10,826,997 B2
(45) Date of Patent: Nov. 3, 2020

(54) DEVICE LINKING METHOD

(71) Applicant: VYNCA, INC., Mountain View, CA (US)

(72) Inventors: Rush L. Bartlett, II, Mountain View, CA (US); Kan-Yueh Chen, Taoyuan (TW); Ching-Cheng Chou, New Taipei (TW); David Lin, Cupertino, CA (US); Po-Min Lin, New Taipei (TW); I-Chien Liu, New Taipei (TW); Matthew S. Taylor, Palo Alto, CA (US); Ryan J. F. Van Wert, Palo Alto, CA (US); Frank Wang, Cupertino, CA (US); Jack Yeh, Mountain View, CA (US); Tsung-Wei Wang, Taipei (TW)

(73) Assignee: VYNCA, INC., Palo Alto, CA (US)

( * ) Notice: Subject to any disclaimer, the term of this patent is extended or adjusted under 35 U.S.C. 154(b) by 736 days.

(21) Appl. No.: 15/341,765

(22) Filed: Nov. 2, 2016

(65) Prior Publication Data
US 2017/0135142 A1     May 11, 2017

Related U.S. Application Data

(60) Provisional application No. 62/372,437, filed on Aug. 9, 2016, provisional application No. 62/251,942, filed on Nov. 6, 2015.

(51) Int. Cl.
*H04L 29/08* (2006.01)

(52) U.S. Cl.
CPC .................. *H04L 67/141* (2013.01)

(58) Field of Classification Search
CPC .... H04W 76/023; H04W 76/021; H04L 67/14
See application file for complete search history.

(56) References Cited

U.S. PATENT DOCUMENTS

| | | | |
|---|---|---|---|
| 6,460,770 B1 | 10/2002 | Kucharczyk | |
| 7,542,912 B1 | 6/2009 | Durand | |
| 8,306,830 B1 | 11/2012 | Renuart et al. | |

(Continued)

FOREIGN PATENT DOCUMENTS

| | | | |
|---|---|---|---|
| WO | 2008084248 | 7/2008 | |
| WO | WO 2013093864 | 6/2013 | |
| WO | WO-2014124014 A1 * | 8/2014 | ........... H04L 63/126 |

OTHER PUBLICATIONS

International Search Report and Written Opinion for PCT/US2014/014880, dated Jun. 20, 2014, 9 pagess.

(Continued)

*Primary Examiner* — Mandish K Randhawa
(74) *Attorney, Agent, or Firm* — Merchant & Gould P.C.

(57) ABSTRACT

Systems, methods, architectures, and computer program products for linking multiple devices are disclosed. In an example for linking a mobile device with a desktop device, an identifier of a mobile device can be received from a desktop computer. The identifier can be used to send a link to the mobile device. When the link is accessed, a code and a channel are generated. The mobile device is connected to the channel and the code is provided to the mobile device. The code is entered at the desktop device and the desktop device is connected to the channel responsive to the code being validated, thereby linking the desktop and mobile devices.

13 Claims, 35 Drawing Sheets

(56) References Cited

U.S. PATENT DOCUMENTS

| | | |
|---|---|---|
| 8,468,610 B2 | 6/2013 | Beals |
| 9,286,482 B1 | 3/2016 | Dumont |
| 9,679,190 B2 | 6/2017 | Bartlett |
| 9,881,201 B2 | 1/2018 | Bartlett |
| 10,425,230 B1 | 9/2019 | Tang et al. |
| 2002/0133470 A1 | 9/2002 | Gruber |
| 2003/0229515 A1 | 12/2003 | Rizvi |
| 2005/0021376 A1 | 1/2005 | Zaleski |
| 2005/0027544 A1 | 2/2005 | Newstead et al. |
| 2005/0102520 A1 | 5/2005 | Baxter et al. |
| 2005/0187794 A1 | 8/2005 | Kimak |
| 2006/0071081 A1 | 4/2006 | Wang |
| 2006/0072144 A1 | 4/2006 | Dowling et al. |
| 2006/0161973 A1 | 7/2006 | Royer |
| 2006/0184865 A1 | 8/2006 | Chakraborty |
| 2006/0287890 A1 | 12/2006 | Stead |
| 2007/0033092 A1* | 2/2007 | Iams ............... G06Q 10/0639 705/7.32 |
| 2007/0130084 A1 | 6/2007 | Kay |
| 2007/0206248 A1 | 9/2007 | Winterbottom et al. |
| 2008/0072334 A1 | 3/2008 | Bailey et al. |
| 2008/0243599 A1 | 10/2008 | Kwak |
| 2009/0037224 A1 | 2/2009 | Raduchel |
| 2009/0132351 A1 | 5/2009 | Gibson |
| 2010/0161993 A1 | 6/2010 | Mayer |
| 2010/0217996 A1 | 8/2010 | Ross et al. |
| 2010/0299437 A1* | 11/2010 | Moore ............... H04L 67/2842 709/226 |
| 2012/0061458 A1* | 3/2012 | Bahr ............... G06K 7/10792 235/375 |
| 2012/0284591 A1 | 11/2012 | Seed |
| 2013/0185210 A1 | 7/2013 | Dodson |
| 2013/0334298 A1 | 12/2013 | Sakpal |
| 2014/0221795 A1 | 8/2014 | Yeager |
| 2014/0275807 A1 | 9/2014 | Redei |
| 2014/0317080 A1 | 10/2014 | Piraino et al. |
| 2015/0199389 A1 | 7/2015 | Morrison et al. |
| 2015/0213404 A1 | 7/2015 | Follis |
| 2015/0242812 A1 | 8/2015 | Nelson |
| 2015/0271179 A1 | 9/2015 | Wang |
| 2015/0294068 A1 | 10/2015 | Bartlett |
| 2015/0347681 A1 | 12/2015 | Bartlett |
| 2015/0358400 A1 | 12/2015 | Bartlett |
| 2016/0012556 A1 | 1/2016 | Moore et al. |
| 2016/0219027 A1* | 7/2016 | Kaplan ............... H04L 63/08 |
| 2016/0226829 A1 | 8/2016 | Steeves et al. |
| 2016/0232214 A1 | 8/2016 | Bonda et al. |
| 2016/0328523 A1 | 11/2016 | Bartlett |
| 2016/0335479 A1 | 11/2016 | Bartlett |
| 2018/0053265 A1 | 2/2018 | Lyon |
| 2018/0139204 A1 | 5/2018 | Votaw et al. |
| 2018/0270070 A1 | 9/2018 | Altman et al. |
| 2019/0163957 A1 | 5/2019 | Bartlett |

OTHER PUBLICATIONS

Softpro Gmbh, "E-Signing on iPad," Retrieved from the Internet URL: https://web.archive.org/web/20120915105226/http://www.softpro.de/data/anonymous_successstories/softpro_insurance_success_story_aia_en.pdf, Retrieved on Jun. 11, 2014 XP055122592, Feb. 1, 2012, 2 pages.

Softpro Gmbh, "Samsung GALAXY Note & ATIV PCs: Electronic Signature with Sign Doc Mobile," Retrieved from the Internet: http://www.slideshare.net/SOFTPROGroup/softpro-signdoc-mobile-app-on-samsung-galaxy-note-electronic-signing, retrieved on Jun. 11, 2014 XP055122653, Apr. 2, 2012, 20 pages.

Trivedi, "Mapping Relational Databases and SQL to MongoDB," https://code.tutsplus.com/articles/mapping-relational-databases-and-sql-to-mongodb—net-35650, Feb. 6, 2014, 15 pages.

Sherman, "Computer-assisted creation of psychiatric advance directives," Community Ment Health J., 34(4):351-362, Aug. 1998.

* cited by examiner

FIGURE 1B

CONNECT TO MOBILE SMART PHONE

By connecting your mobile phone, you can digitally sign the form and view educational videos.

1. Type your email here.
2. Open up the email in your mobile phone.
3. Open the link inside that email to connect.

Phone Number or 107

E-Mail Address 108

Submit

WAITING FOR MOBILE TO CONNECT

FIGURE 1C

CONNECT TO MOBILE SMART PHONE

By connecting your mobile phone, you can digitally sign the form and view educational videos.

1. Type your email here.
2. Open up the email in your mobile phone.
3. Open the link inside that email to connect.

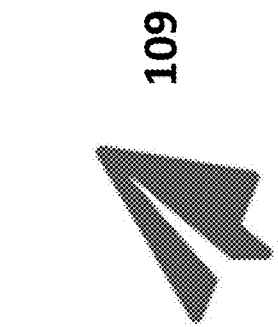

109

Refresh every 5 minutes 06:59:59  110

WAITING FOR MOBILE TO CONNECT

Click here to
link device:
http://www.ab
c.xyz/a8w9dfj3
oitjt

Enter the
authentication
code: 203

Linked content 204

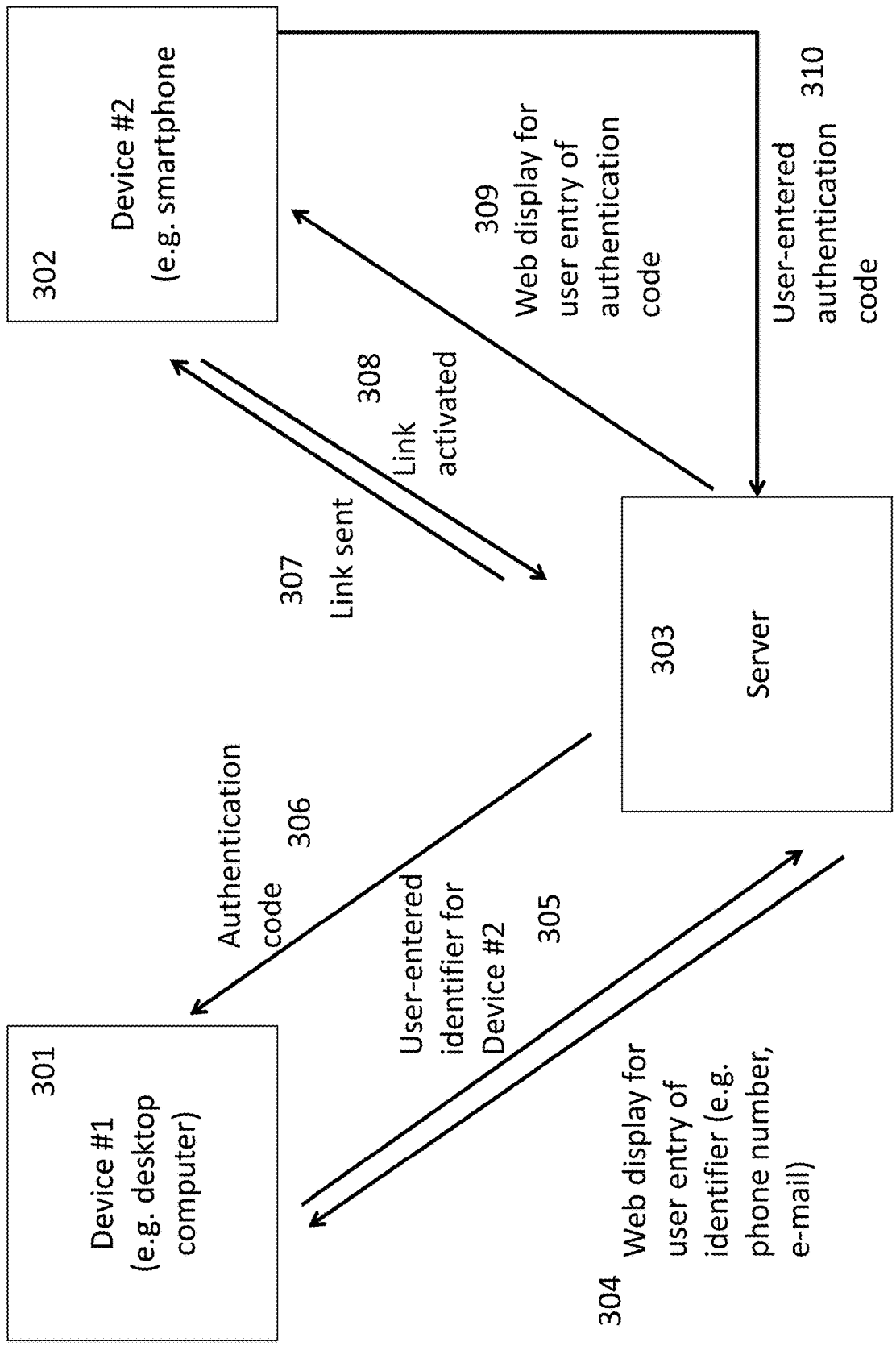

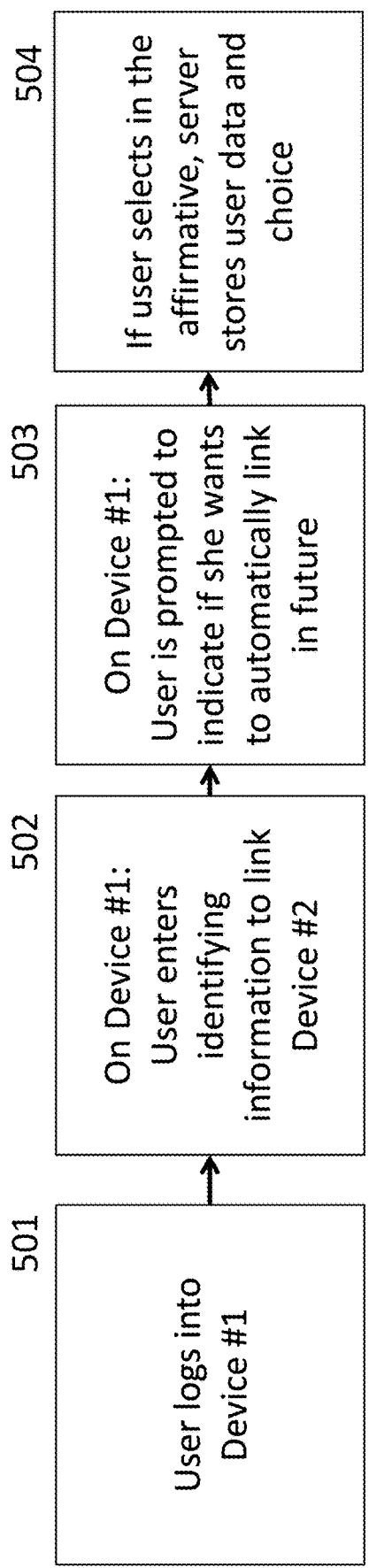
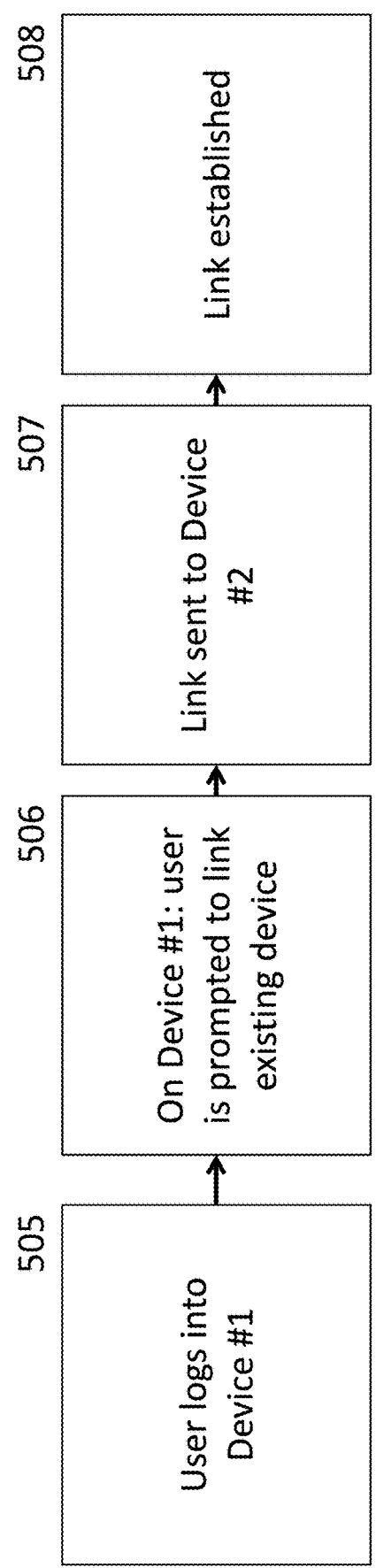
FIGURE 5A
FIGURE 5B

DEVICE LINKING METHOD

CROSS-REFERENCE TO RELATED APPLICATIONS

This application claims priority to U.S. Provisional Patent Application Ser. No. 62/251,942, filed Nov. 6, 2015, entitled "Device Linking System and Method"; and 62/372,437, filed Aug. 9, 2016, entitled "Device Linking System and Method." Both of the above-referenced applications are hereby incorporated by reference herein in their entireties.

BACKGROUND

The smartphone has significant data input and acquisition functionality that traditional desktop computers do not have. These include touch screen technology, built-in cameras, video cameras, accelerometers and GPS sensors. The desktop computer commonly has a keyboard and mouse as the only means of data entry.

In many instances, it would be convenient to link a user interface on a desktop computer with a user's smartphone, tablet or other mobile device, to allow the user to access the broad capability for data input, acquisition and output of the smartphone or other device. In some cases, however, security and privacy issues may arise when linking a smartphone with a desktop. For example, privacy issues are always important to address when dealing with medical records of patients in a hospital or clinic setting. Previously described methods and systems for linking devices often lack sufficient security for highly private information such as medical records, or they may be very cumbersome to use, or in some cases both.

Therefore, it would be desirable to have an improved method and system for linking a user interface on a desktop computer with a user's smartphone, tablet and/or other mobile computing device. Ideally, the method and system would be easy to use and also provide adequate security measures so that sensitive, private data could be accessed via the linked device(s). At least some of these objectives will be addressed by the embodiments described below.

SUMMARY

The disclosed system and method allow for a web session or web-enabled application on a first device, including but not limited to a desktop computer, to be linked to the web session or web-enabled application of a second device, including but not limited to a smartphone, tablet or other mobile device.

In one aspect of the present disclosure, a method for linking a desktop computer with a mobile device may involve: receiving an identifier of a mobile device from a desktop computer; sending a link to the mobile device using the identifier of the mobile device; generating a code and a channel responsive to the link being activated, wherein the code is associated with the channel; connecting the mobile device to the channel; providing the code to the mobile device for entry at the desktop computer; receiving an entered code from the desktop computer; and connecting the desktop computer to the channel in response to the entered code matching the code associated with the channel, thereby linking the desktop computer with the mobile device.

In some embodiments, the desktop computer may be a notebook computer. In some embodiments, the identifier may be a telephone number and/or email address. In some embodiments, the method may further involve receiving a signature from the mobile device and providing the received signature for display at the desktop computer.

In another aspect of the present disclosure, a method for linking a desktop computer with a mobile device may involve: receiving a send mobile link request from a desktop computer, the send mobile link request comprising a mobile device identifier; generating a link; sending the link to a mobile device associated with the mobile device identifier, using the mobile device identifier; receiving an indication that the link was activated; generating multiple codes and a channel ID, in responsive to the received indication; providing a first code of the multiple codes to the mobile device and initiating a communication protocol using the channel ID, in response to a code request from the mobile device, wherein the first code is provided to be entered at the desktop computer; connecting the mobile device to a communication channel associated with the channel ID using the communication protocol; receiving the first code from the desktop computer; retrieving the channel ID using the first code from the desktop computer; and connecting the desktop computer to the communication channel associated with the channel ID using the communication protocol, thereby linking the desktop computer with the mobile device.

In some embodiments, the communication protocol may be Web Socket. In some embodiments, the mobile device identifier is selected from the group consisting of a phone number and an email address. In some embodiments, the method may further involve:

determining whether the desktop computer has a session cookie from a previous linking session; and responsive to the session cookie from a previous linking session being different from an active session cookie, generating a new session cookie for a current linking session, thereby invalidating the previous linking session. In some embodiments, the method may further involve: responsive to receiving the send mobile link request, determining whether the desktop computer is currently connected to a communication channel; and responsive to determining that the desktop computer is connected to a communication channel, removing from the communication channel any device connected to that communication channel.

In some embodiments, generating the plurality of codes may involve: determining whether more than a threshold number of codes were generated using the link; and responsive to determining that more than the threshold number of codes were generated, invalidating the link. In some embodiments, the method may further involve: responsive to generating the link, starting an auto-expire timer that, upon reaching a threshold time, causes the link to be invalidated and causes the plurality codes generated by the link to be invalidated. In some embodiments, the method may further involve, responsive to receiving an indication that the link was activated, resetting the auto expire timer. In some embodiments, the method may further involve, responsive to retrieving the channel ID using the code, invalidating the plurality of codes. In some embodiments, the method may further involve preventing more than one mobile device from communicating over the channel. In some embodiments, the method may further involve, responsive to determining that the mobile device is being actively used, preventing the desktop computer from logging off.

In another aspect of the present disclosure, a method may involve: receiving, from a first device, an identifier of a second device; sending a link to the second device using the identifier; generating a code and a communication channel responsive to the link being accessed, wherein the code is associated with the communication channel; connecting the second device to the communication channel; providing the code to the second device for entry at the first device; receiving an entered code from the first device; and responsive to the entered code matching the code associated with the communication channel, connecting the first device to the channel, thereby linking the first device and the second device.

In some embodiments, the method may further involve permitting the first device to send data to a backend server, and preventing the second device from sending data to the backend server other than through the first device. In some embodiments, the method may further involve, receiving a change to a document from the second device, and providing the change to the first device through the communication channel, wherein the change is provided to the backend server through the first device. In some embodiments, the code may be provided to the second device for display on a first webpage, and the received entered code may provided on a second webpage. In some embodiments, the first device may be a computer of a care provider, and the second device may be a mobile device of a patient.

These and other aspects and embodiments are described in greater detail below, in references to the attached drawing figures.

BRIEF DESCRIPTION OF THE DRAWINGS

FIG. 1B depicts exemplary data entry fields to collect information required to link to a second device, according to one embodiment;

FIG. 1C depicts an exemplary screen during the linking process, according to one embodiment;

FIG. 2A depicts a link sent to a second device that is to be linked, according to one embodiment;

FIG. 2B depicts the mechanism for data entry for the authentication code, according to one embodiment;

FIG. 2C depicts linked content displayed after the device is linked, according to one embodiment;

FIG. 3 depicts the step-by-step process for using an exemplary system to link two devices, according to one embodiment;

FIG. 5A depicts an exemplary linking workflow, in which the user may select automatic linking in the future, according to one embodiment;

FIG. 5B depicts an exemplary linking workflow for the user, according to one embodiment;

FIG. 6A depicts an exemplary linking workflow user interface for the user, where a numerical code is sent to a second device and accessed on the second device to be input on the user interface of the first device, according to one embodiment;

FIG. 6O depicts an exemplary linking workflow user interface for the user, where an eSignature display feature on a first device is shown with a linked feature icon indicating linking on a second device where input could be made, according to one embodiment;

FIG. 6R depicts an exemplary linking workflow user interface for the user, where a an electronic signature is entered from a second device and displayed through the linked feature on the first device, according to one embodiment;

DETAILED DESCRIPTION

Figure 1A:
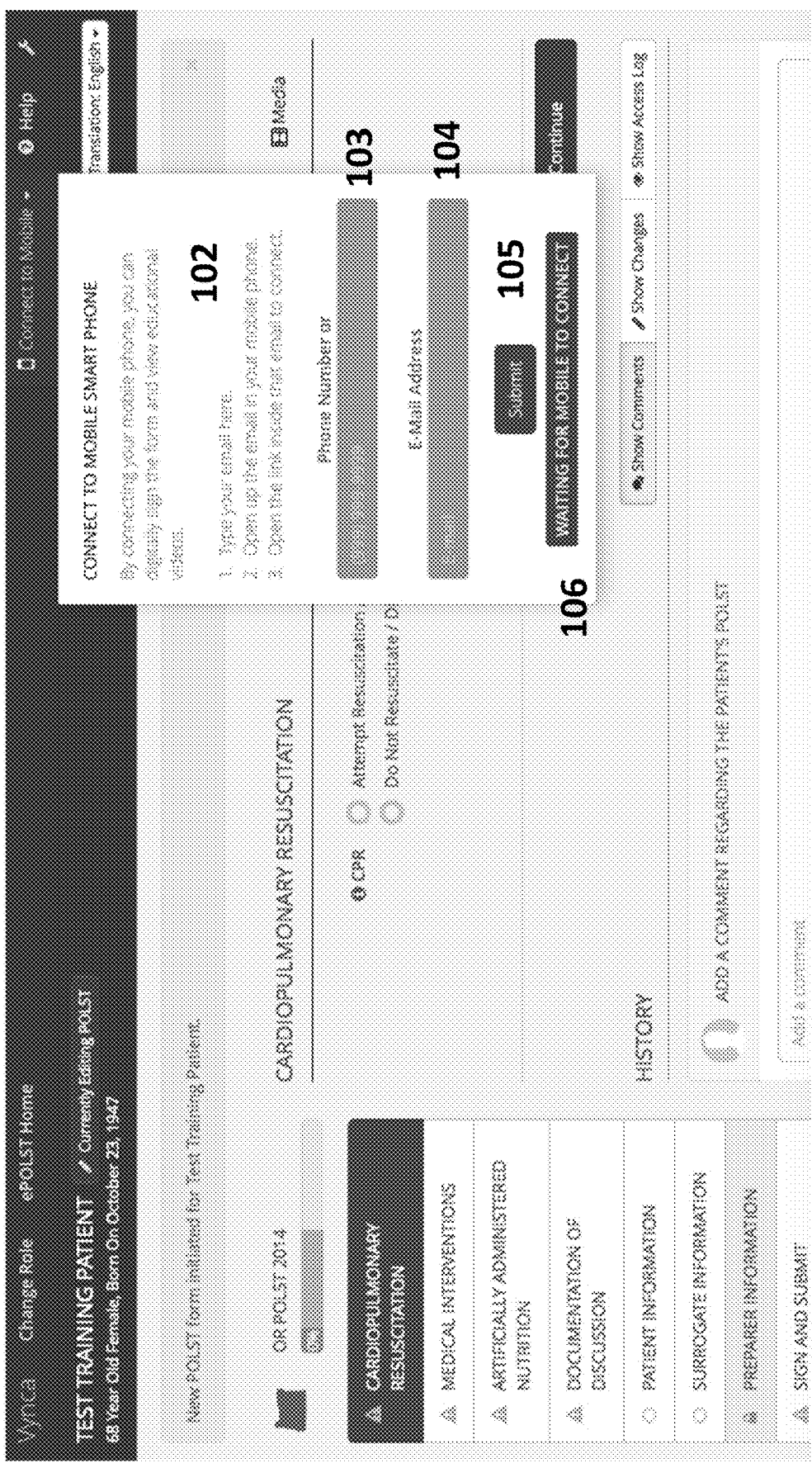
FIG. 1A an exemplary web interface used on one device to link to another device, according to one embodiment.

The following description of various embodiments should not be used to limit the scope of the present invention. Alternative embodiments, features, aspects, variations and advantages are included within the scope.

In various embodiments of the system and method, a user initiates the linking process through a web session on a first device, such as a desktop computer. The user is prompted to enter at least one identifier that can be used to identify the second device, such as a smartphone, tablet or other mobile device, and/or which can be accessed from the second device, such as through a messaging or communication service, including but not limited to electronic mail, browser, link, embedded link, HTML5 notification, emergency notification, text message, photo sharing service, link sharing service, mobile messaging application, and any application, which may be encrypted or not encrypted. Such identifiers include, but are not limited to, an e-mail address, cellular phone number, unique device identifier (UDID), device serial number, International Mobile Station Equipment Identity (IMEI), Integrated Circuit Card ID (ICID), RFID signal, blue tooth signal, device unique power usage profile, device resonance frequency, Mobile Equipment Identifier (MEID) or other identifier tied to the second device or the user thereof.

The identifier is used to send linking information to the second device. This may include, but is not limited to, a web hyperlink sent via short message service (SMS), e-mail, or any type of push notification. The link, when activated, opens a web page and/or application prompting the user to input a second unique identifier, which is concurrently displayed on the screen of the first device. Such second unique identifiers include, but are not limited to, a string of alphabetical and/or numerical characters, images, trademark images, brand images, audible or inaudible sound from a speaker, phrases or any other unique image, signal, form, sequence or code displayed by a device or system. The second unique identifier may also be an object or traceable image or description of an action that a user must undergo with the phone, in order to have the sensors on the phone detect that such an action has taken place, such as but not limited to moving the phone in a specific way, causing the accelerometers to read a pattern, such as tapping in a distinct rhythmic pattern or moving in a figure eight.

The unique identifier may be generated by an algorithm, program, or software, which may reside on the first device, second device, or on an alternate location, including but not limited to a server or third device. The unique identifier may be specifically generated for a single session between the receiving and collecting device, or be used to link the two devices on a long-term basis. Auxiliary services for generating or reading the unique identifier may be used.

Communication between devices may occur through a wireless or wired connection, including but not limited to the Internet, wifi, Bluetooth, radio waves, microwaves, or other electromagnetic waves capable of transmitting data.

Once linked, the first device and second device may be used to display or acquire data for the other device. For example, one device may collect any type of data, including but not limited to images or text generated through a user touching a touch screen, typed data from a keypad, sound captured from a microphone, pictures or video captured from a camera, or other information recorded from a sensor, such as a RFID, infra-red sensor, magnetic sensor, or other means. Such data acquisition features may be built into the device or add-on or peripheral devices. Such data from the first device may then be transferred in whole or in part and displayed on the second device, and vice versa, and/or stored elsewhere, including a third device or server. The data may be sent from the first device to the second device instantaneously or stored on the collecting device or an intermediate device until a later time.

The user or users may acquire data using the collecting device and direct its placement to the receiving device. For example, if the collecting device is used to collect a signature generated from its touch screen, the user may direct where the signature image is to appear on the receiving device. In this instance, the user may select a place on a document they are viewing or editing on the receiving device for the signature to appear.

The receiving device may also direct the type of data to be collected by the collecting device. For example, if a user opens a web page on the receiving device, whose purpose in part or in whole is to contain a picture, the receiving device may remotely activate the camera on the collecting device to capture the desired image. If there is a web page on the receiving device whose purpose, in part or in whole, is to collect a sound recording, the receiving device may remotely activate the microphone. If there is a web page on the receiving device whose purpose, in part or in whole, is to collect a signature, the receiving device may remotely activate a blank web page or otherwise activate the touch screen in order to collect the signature from the touch screen.

Alternatively, the user may select the desired functionality for data acquisition through an application, web page or other means on the collecting device, or through an application, web page or other means on the receiving device, including but not limited to mouse clicking icons that direct the type of data to be collected, using mouse clicks to direct the location of data on a web page, document or other digital media on the receiving device.

Alternative workflows for how the first device is linked to the second device may include a variety of scenarios where a unique identifier is displayed on the phone, and then the computer prompts the user to input the unique identifier onto the computer. The first step of this workflow may include the user inputting an email, phone number, or other identifying feature as to where the computer would send a message with a link to a second device, such as but not limited to a tablet, other computer, or smartphone. Once the link is sent from the computer, the user interface on the computer would change to allow for capturing an input of the unique identifier from the user. Also, once the link is sent from the computer it is received by a second device in a format such as but not limited to a packet, email, text message, sms, message code, certificate, or other messaging paradigm. That message is accessible by the user or a system with the user's second device. In this embodiment, the link would be activated by the user or system when the second device receives the message. This may be done automatically or by the user by completing a user action, such as but not limited to clicking or selecting or touching a link on a message such as an email or text message. Once the link is activated it opens a webpage on the second device which would display a unique code or identifier on the $2^{nd}$ device. This display may include a countdown timer or time out after a period of time, although it does not necessarily need to do these tasks. The unique code or identifier is used by the user or their device as the input into a user interface or system from the first device, in order for the first device to validate that the second device can gain access to the system. The benefits of this paradigm may include being more secure, because it may, but not necessarily, demand that the user of the second device have physical or at least remote access to the first device. In the case of a hospital medical record system, this would mean that the user of the second device must have the ability to log into the system on the first device, which would allow for the code to be generated and sent to the second device and also the interface or capability that would allow for that code to be input on the first device in order to allow for authentication of the second device to link securely to the first device.

FIG. 1A shows an exemplary web session 101 on a first device, in which the user is provided instructions 102 on entering an identifying code for a second device, here a phone number 103 or an e-mail address 104. Once the identifier is entered, the data are submitted 105 and a linking status is also displayed 106.

FIG. 1B shows an exemplary web session on a first device in which the user has entered a phone number 107 as the identifier for the second device; no e-mail address has been entered 108 in this example.

FIG. 1C shows an exemplary web session on a first device, once the identifying information has been submitted for linking. A status message 109 and linking code 110 are displayed.

Figure 1E:
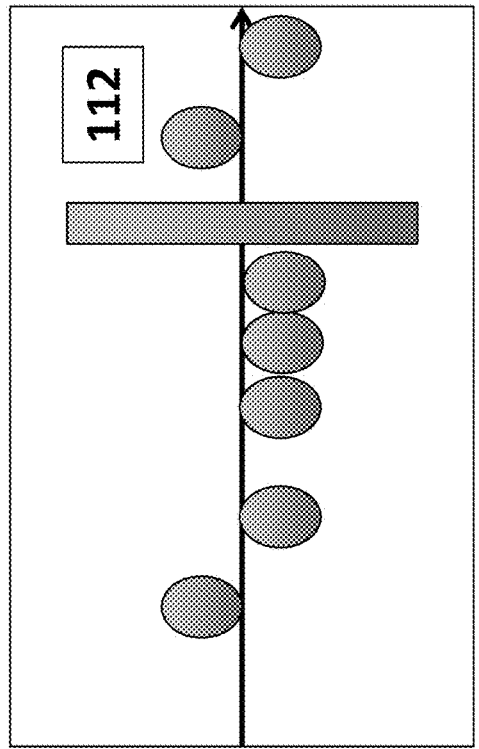
FIG. 1E depicts an exemplary screen during the linking process, where the process to link is to move the device to be link in a specific rhythmic pattern following the screen on the initial device, according to one embodiment.
Figure 1D:
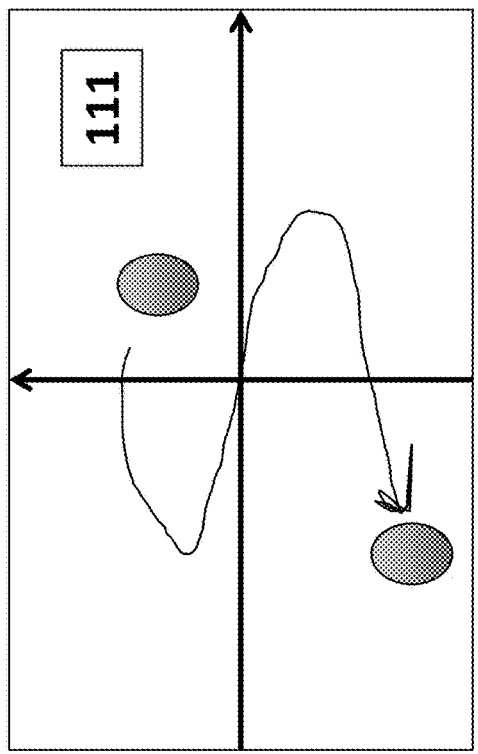
FIG. 1D depicts an exemplary screen during the linking process, where the process is to move the device to be linked in a specific movement following the screen on the initial device, according to one embodiment.

FIG. 1D shows an exemplary web session on a first device, once the identifying information has been submitted for linking. A status message and a follow the leader display, illustrating a video of the linking code as a movement 111, prompts the user to move the device to be linked in a specific pattern relative to the screen, in order to read the signal and link the devices.

FIG. 1E shows an exemplary web session on a first device once the identifying information has been submitted for linking. A status message and a display similar to a music play-along game prompts the user to move the device to be linked in a specific pattern, in order to link the two devices, using the movement as the code 112.

FIG. 2A shows an exemplary second device, here a smartphone 201, in which a link is received and displayed 202, with an instruction to click on the link. FIG. 2B shows the exemplary smartphone 201 with a data entry screen shown to enter the authentication code 203. FIG. 2C shows the exemplary smartphone 201 after linking where the desired linked content is displayed 204.

FIG. 3 shows exemplary data flow between a first device 301, a second device 302 and a server 303, to perform the linking process. First, the server 303 sends a web display for user entry of the identifier for the second device 302 to the first device 301, 304. The user enters the desired identifier 305, and an authentication code is returned and displayed on the first device 306. A link is then sent to the second device 307, which when activated by the user 308 prompts the display of a data entry screen for the authentication code 309. The user enters the authentication code 310 to complete the linking process.

Figure 4:
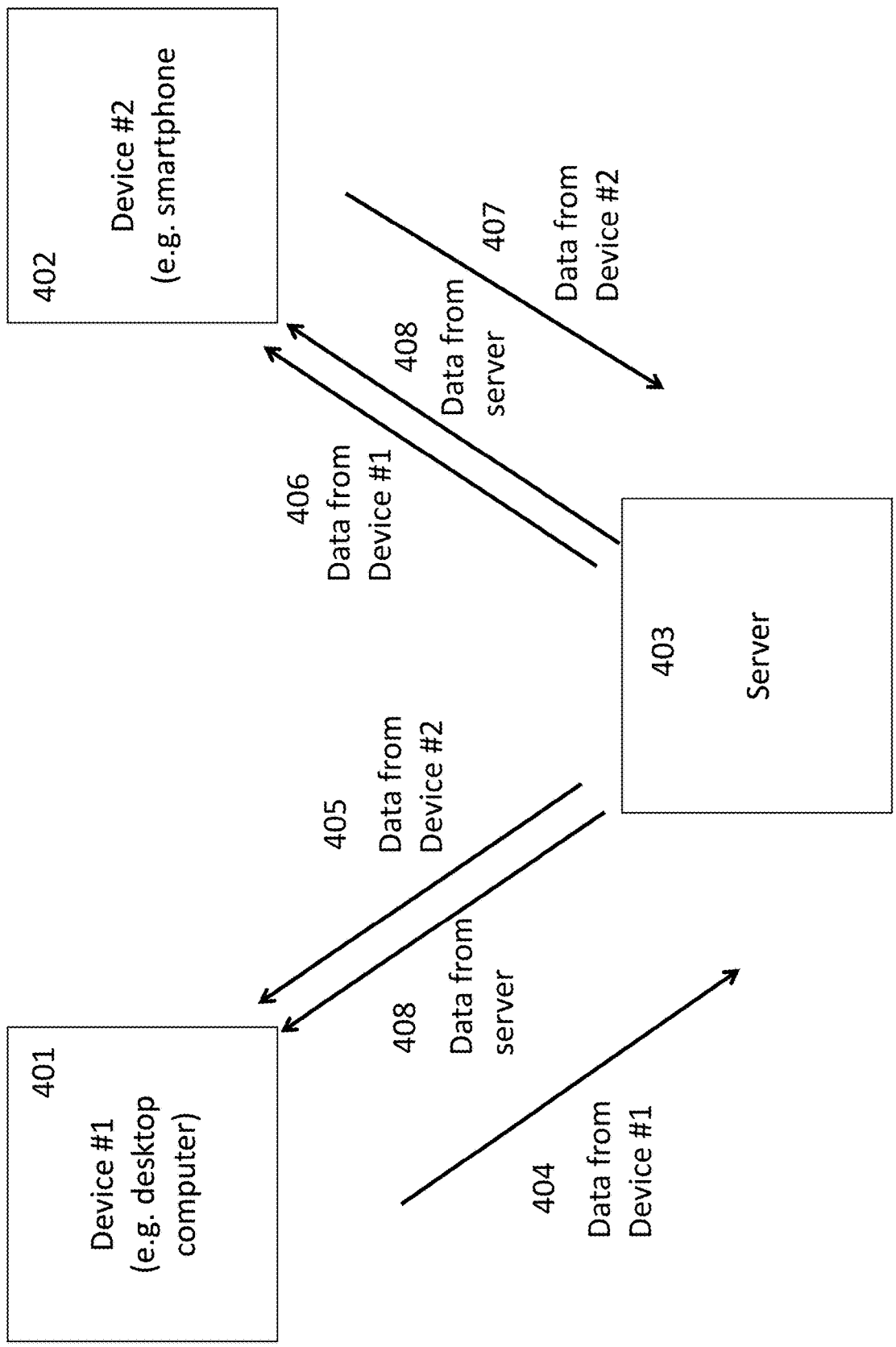
FIG. 4 depicts an exemplary data flow between two linked devices, according to one embodiment.

FIG. 4 shows exemplary data flow between the first device 401, second device 402 and a server 403, once they are linked. Data 404 may be received from the first device 401, which may or may not be user entered, and may be displayed on the second device 406. Similarly, data 407 from the second device 402 may be sent 405 to the first device 401. In fact, data may be sent to each respective device 408 depending on the flow of the session and user behavior.

FIG. 5A shows an exemplary linking flow, in which the user logs into to a web interface on a first device 501, enters identifying information for the second device 502 and is asked whether he/she wishes to save their linking information for future automated linking 503. If the user selects this option, the identifying information for the second device is associated with the user and saved accordingly 504.

FIG. 5B shows an exemplary linking flow, in which the user has previously indicated a desire to link the first device to the second device, as in FIG. 5A. After the user has logged in 505 to the first device, the user is asked is he/she wishes to link to the second device 506. If the user indicates an affirmative choice, a link is sent to the second device automatically 507, based on previously stored identifying information for the second device, and a link is established 508.

Figure 6A:
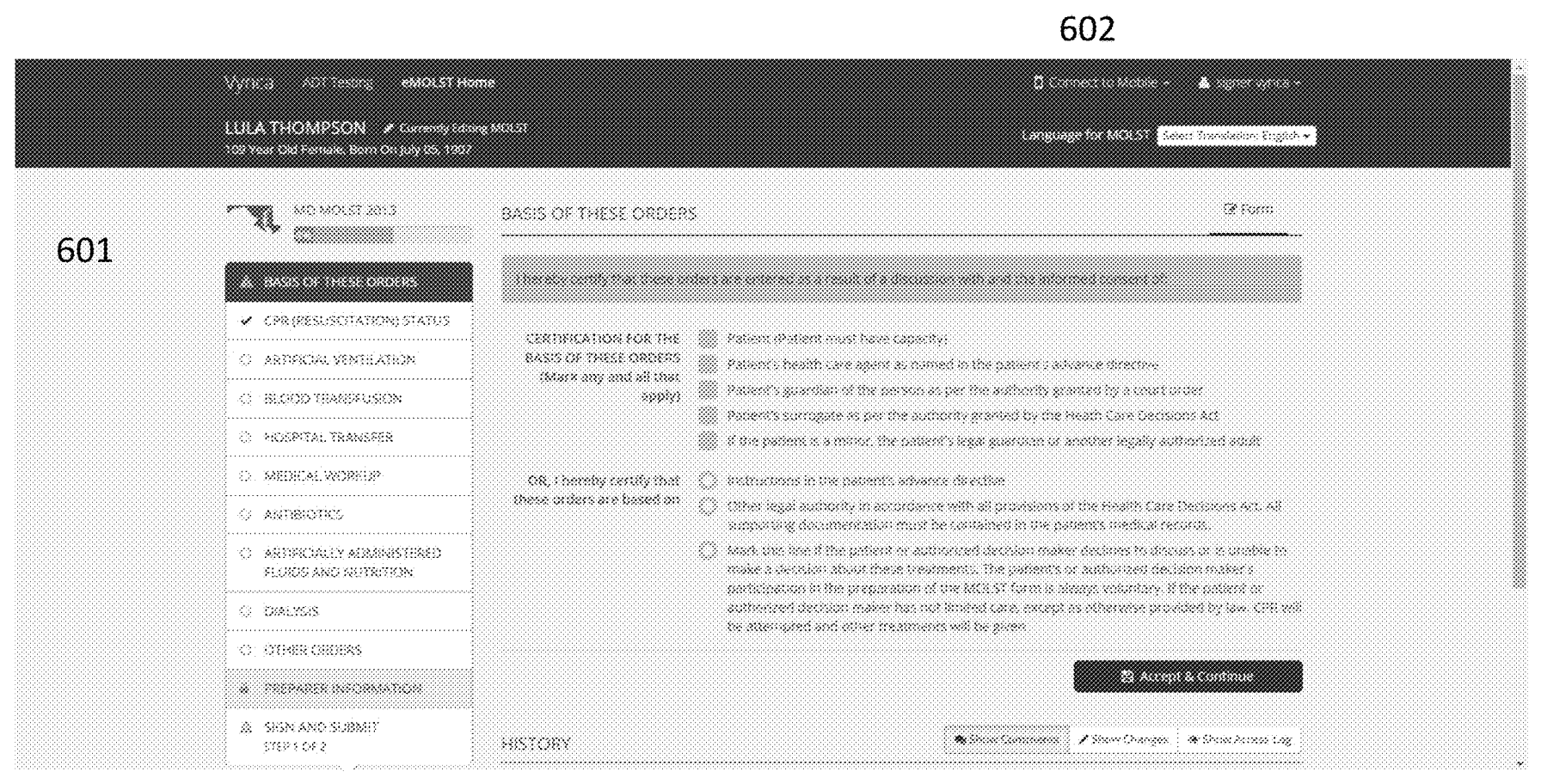

FIG. 6A shows an exemplary user interface flow for an electronic POLST or advance care planning documentation system for cloud based electronic medical records 601 that contains a secondary device linking feature 602 that can be used to link a second device to the session on the cloud based electronic medical records system 601 running on a first device.

Figure 6B:
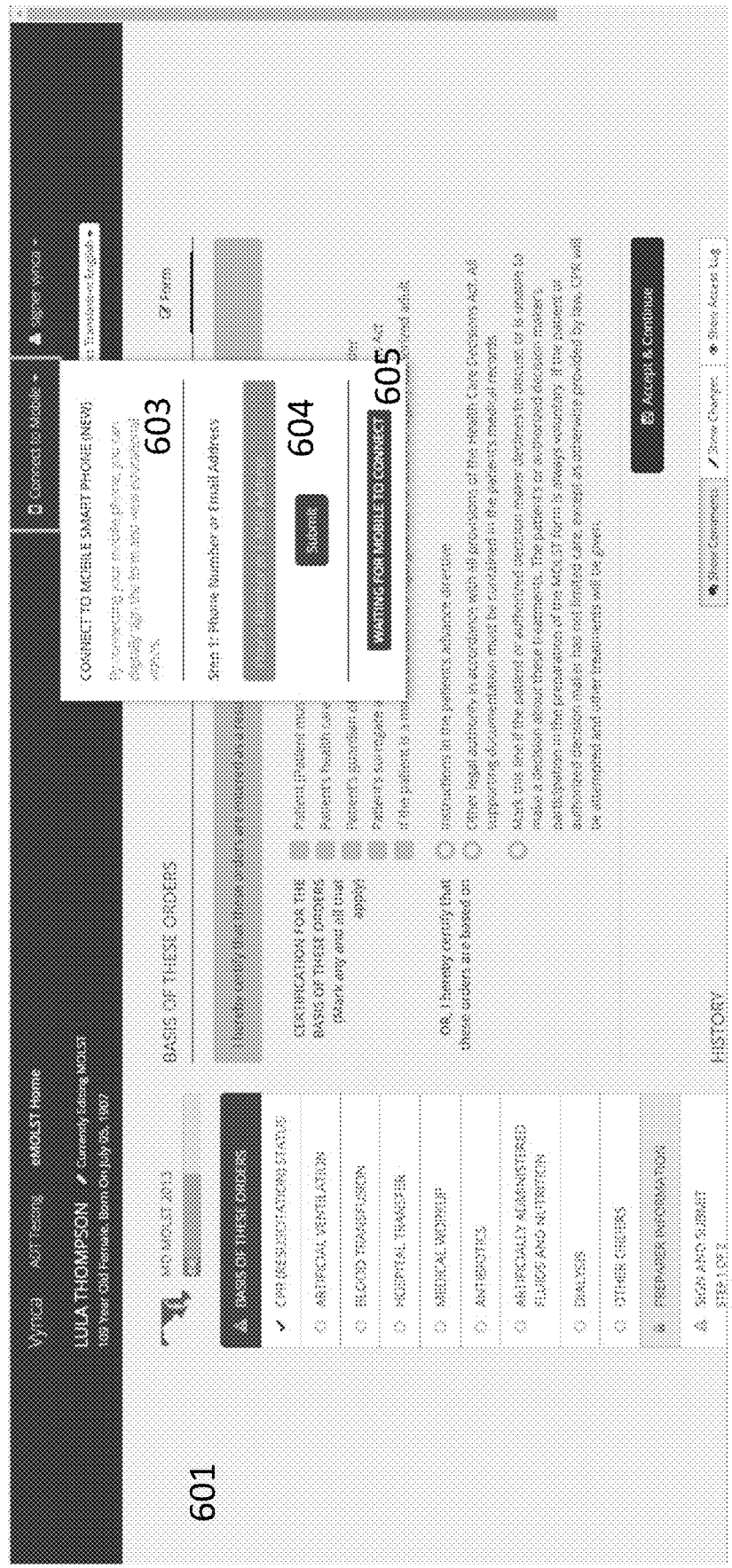
FIG. 6B depicts an exemplary linking workflow user interface for the user, where an identifying element of a second device is entered on a first device to indicate the location and/or method of where a first device should send a link to a second device, according to one embodiment.

FIG. 6B shows an exemplary user interface flow for an electronic documentation system 601 that contains a secondary device linking feature 602 that can be used to link a second device to the session on the cloud based electronic documentation system 601 running on a first device. In this embodiment, the linking feature 602 can be clickable to show an interacting window, with instructions for how to link 603 a second device to the session on the first device. The linking feature 602 also contains a mechanism to submit 604 a user input of an unique identifier of a device desired to be linked and a status indicator 605 demonstrating the status of the connection link.

Figure 6C:
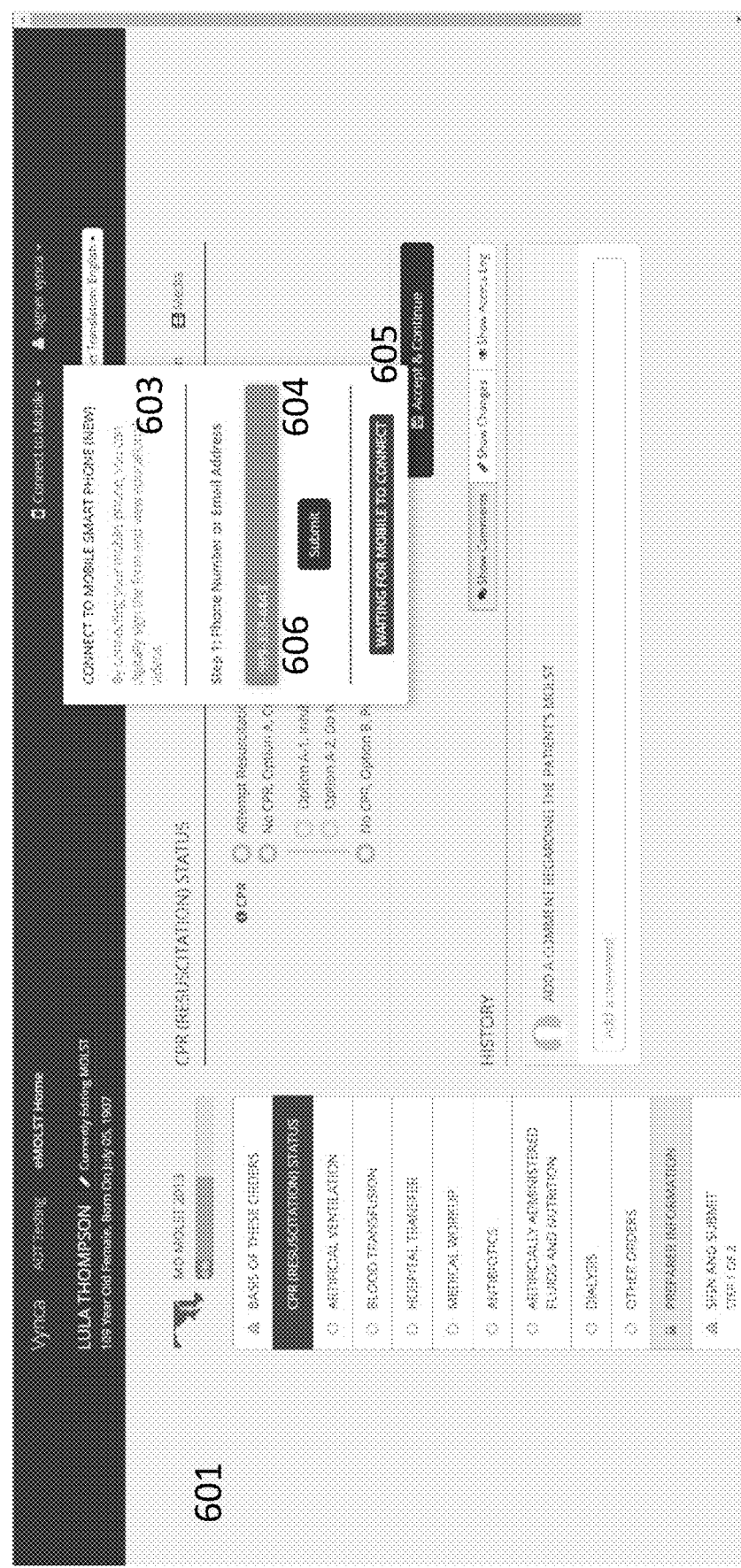
FIG. 6C depicts an exemplary linking workflow user interface for the user, where an identifying element of a second device is a phone number and is entered on a first device to indicate the location and/or method of where a first device should send a link to a second device, according to one embodiment.

FIG. 6C shows an exemplary user interface flow for an electronic documentation system 601 that contains a secondary device linking feature 602 that can be used to link a second device to the session on the cloud based electronic documentation system 601 running on a first device. In this embodiment, the linking feature 602 can be clickable to show an interacting window with instructions for how to link 603 a second device to the session on the first device. The linking feature 602 also contains a mechanism to submit 604 a user input of an unique phone number identifier 606 of a device desired to be linked and a status indicator 605 demonstrating the status of the connection link. The device may send an SMS, text, or other message to the phone number added by the user 606 to the linking feature 602 user input interface after the submit button is clicked 604. In some embodiments, the submit feature may happen automatically once a pre-defined set of characteristics are met in the phone number identifier submission 606, without a user needing to click submit 604.

Figure 6D:
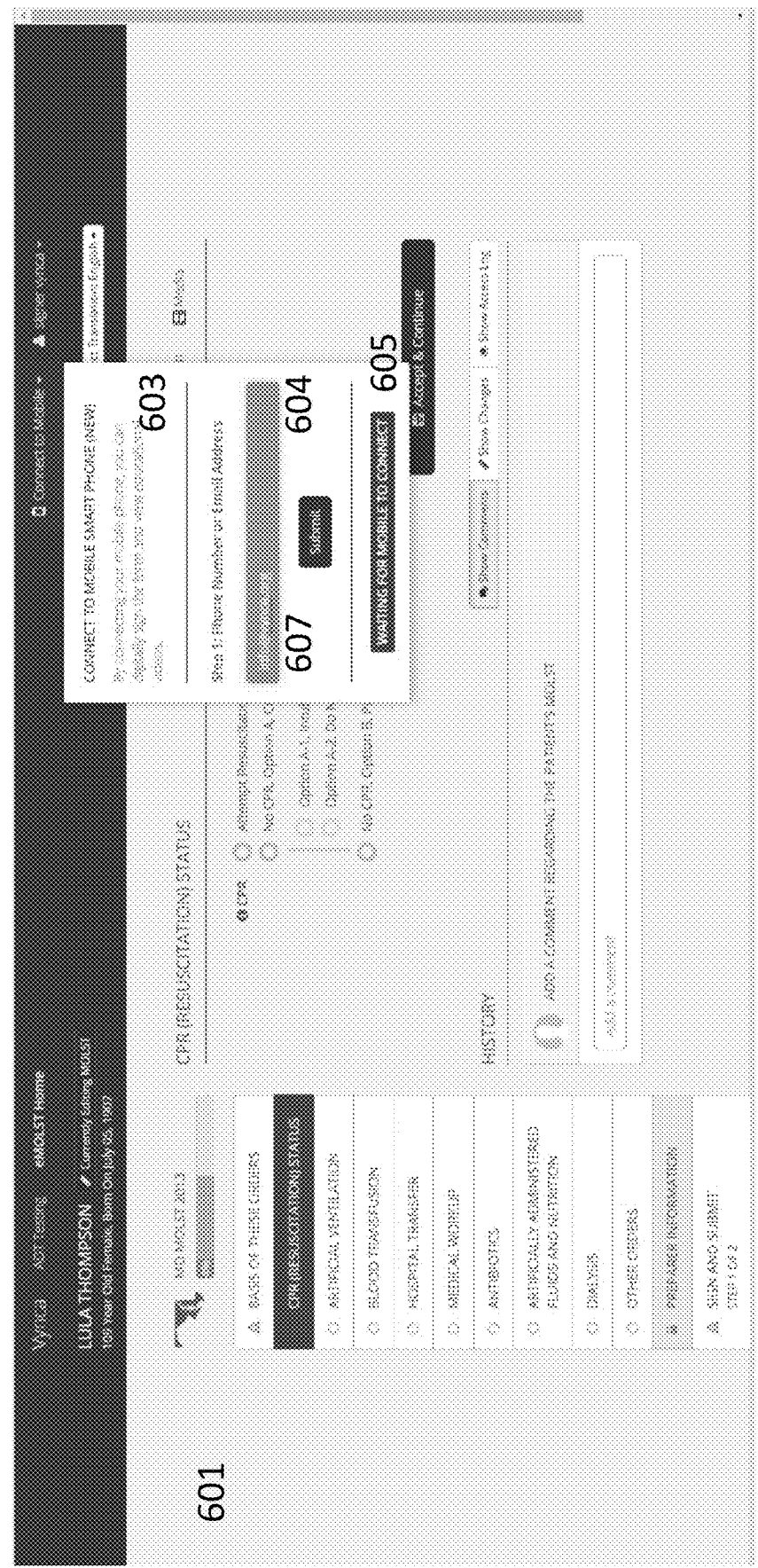
FIG. 6D depicts an exemplary linking workflow user interface for the user, where an identifying element of a second device is an email address and is entered on a first device to indicate the location and/or method of where a first device should send a link to a second device, according to one embodiment.

FIG. 6D shows an exemplary user interface flow for an electronic documentation system 601 that contains a secondary device linking feature 602 that can be used to link a second device to the session on the cloud based electronic documentation system 601 running on a first device. In this embodiment, the linking feature 602 can be clickable to show an interacting window with instructions for how to link 603 a second device to the session on the first device. The linking feature 602 also contains a mechanism to submit 604 a user input of an unique email address identifier 606 of a device desired to be linked and a status indicator 605 demonstrating the status of the connection link. The device may send an email, SMS, text, or other message to the email address added by the user 606 to the linking feature 602 user input interface after the submit button is clicked 604. It is also noted that the submit feature may happen automatically once a pre-defined set of characteristics are met in the email address identifier submission 606 without a user needing to click submit 604.

Figure 6E:
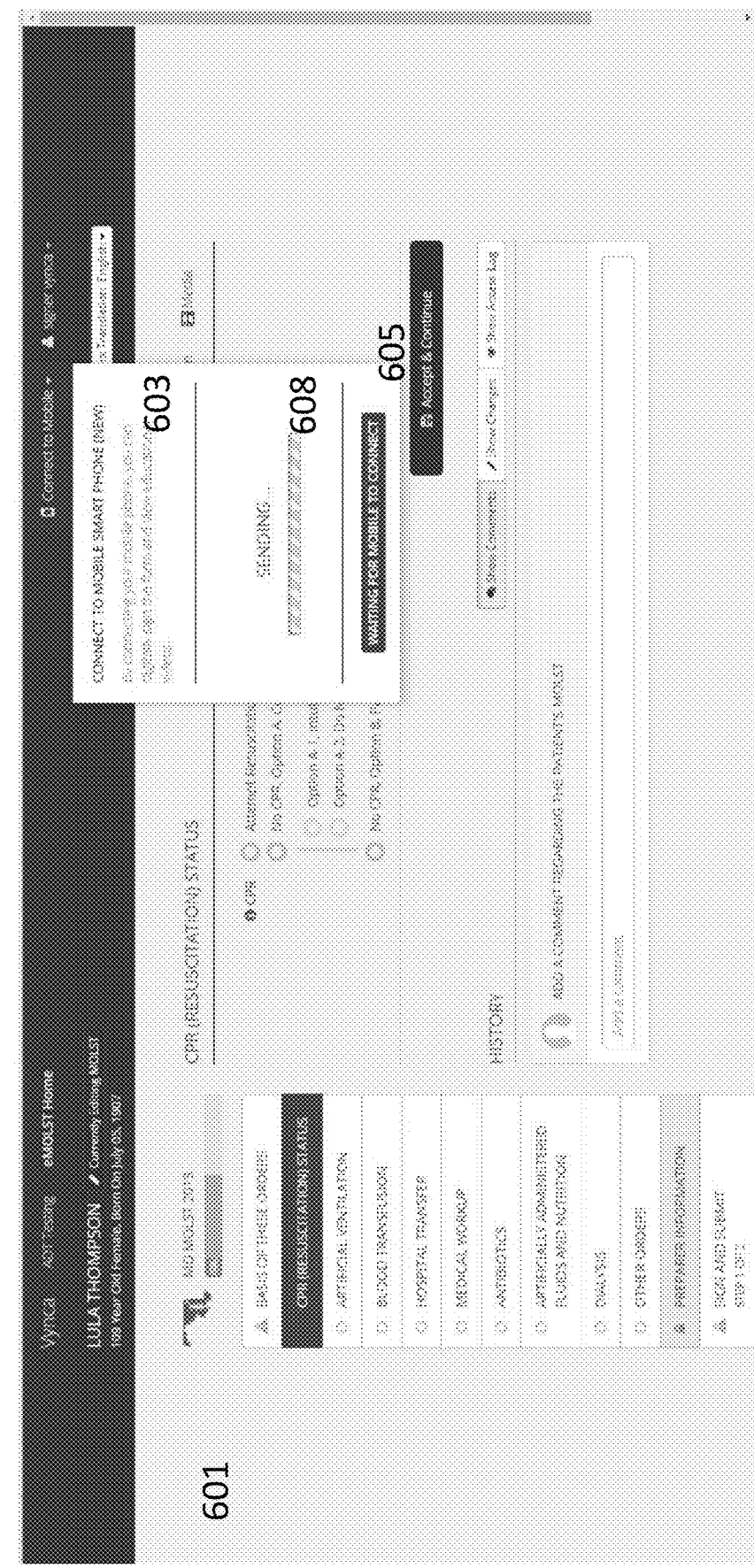
FIG. 6E depicts an exemplary linking workflow user interface for the user, where a link is being sent to a second device and a status message is being displayed to the user of the first device, according to one embodiment.

FIG. 6E shows an exemplary user interface flow for an electronic documentation system 601 that contains a secondary device linking feature 602 that can be used to link a second device to the session on the cloud based electronic documentation system 601 running on a first device. In this embodiment, the linking feature 602 can be clickable to show an interacting window with instructions for how to link 603 a second device to the session on the first device. The linking feature 602, once a unique user input has been added, may display a status sending or update message 608 indicating the status of the user input message being transmitted to the desired second device as a text message or email. The linking feature 602 also contains a status indicator 605 demonstrating the status of the connection link, and this status indicator 605 is separate from the indicator of sending of a message to a desired device. The status indicator 605 has the principle purpose of demonstrating if a link is live between a second device and a first device's session. Both the status indicator 605 and the status sending or update message 608 may be incorporated into the same workflow user display, or alternatively they may be separate.

Figure 6F:
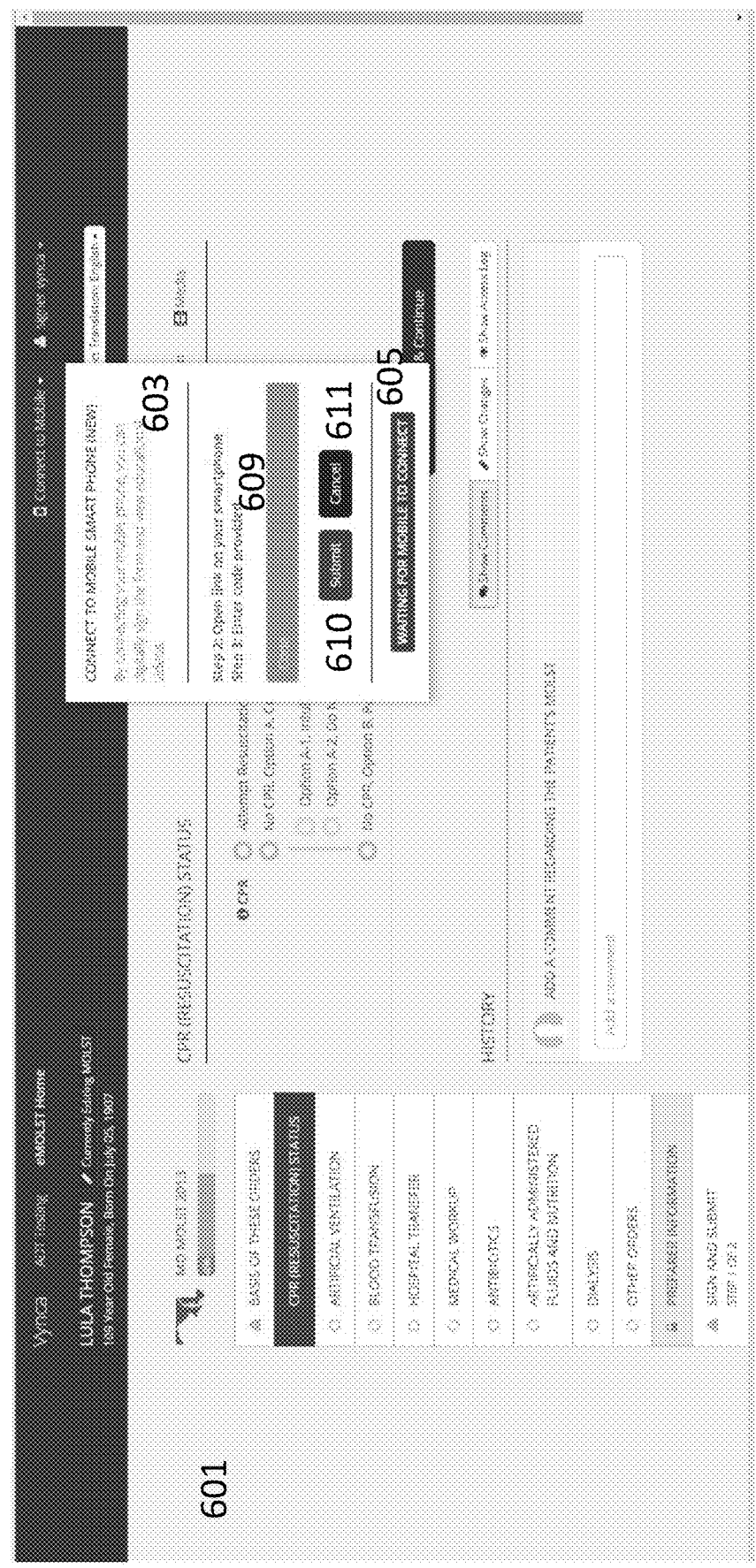
FIG. 6F depicts an exemplary linking workflow user interface for the user, where an alpha numerical code displayed on a second device would be entered on a first device, according to one embodiment.

FIG. 6F shows an exemplary user interface flow for an electronic documentation system 601 that contains a secondary device linking feature 602 that can be used to link a second device to the session on the cloud based electronic documentation system 601 running on a first device. In this embodiment, the linking feature 602 can be clickable to show an interacting window, with instructions for how to link 603 a second device to the session on the first device. The instructions for how to link 603 may update as new steps in the process are needed. For instance, once a message has been sent to a second device with a link to access a code, that code can be added to the user interface code accept box 609 and submitted to link the session 610. In addition, if the user desires to send another link to a different device, they can click cancel 611 in order to input a new email or phone number to send a new message with a different code. The status indicator 605 will change, if a link is live between a second device and a first device's session.

Figure 6G:
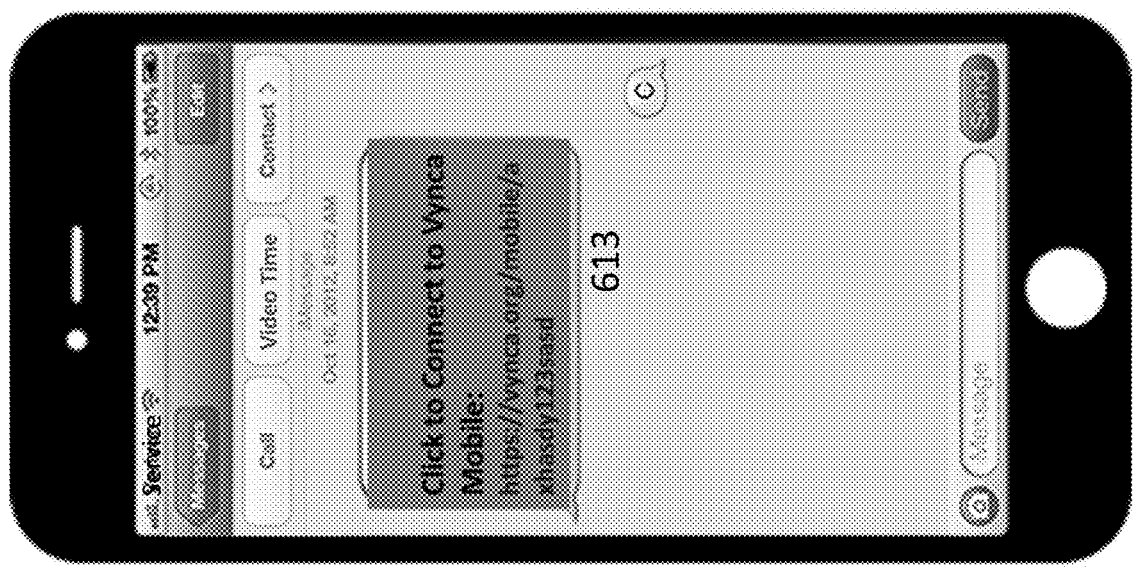
FIG. 6G depicts an exemplary workflow user interface, where a link to a secure code is displayed on a mobile device or tablet, according to one embodiment.

FIG. 6G shows an exemplary user interface flow for linking a mobile device 612 to a first device, such as a desktop computer web session. The linking mechanism includes a message 613 that is sent to the mobile device 612 with a link in the message 613, so the user can click the link and retrieve a specific code to be entered on the desktop computer web session on the first device to link and authenticate the mobile device to be linked to the session.

Figure 6H:
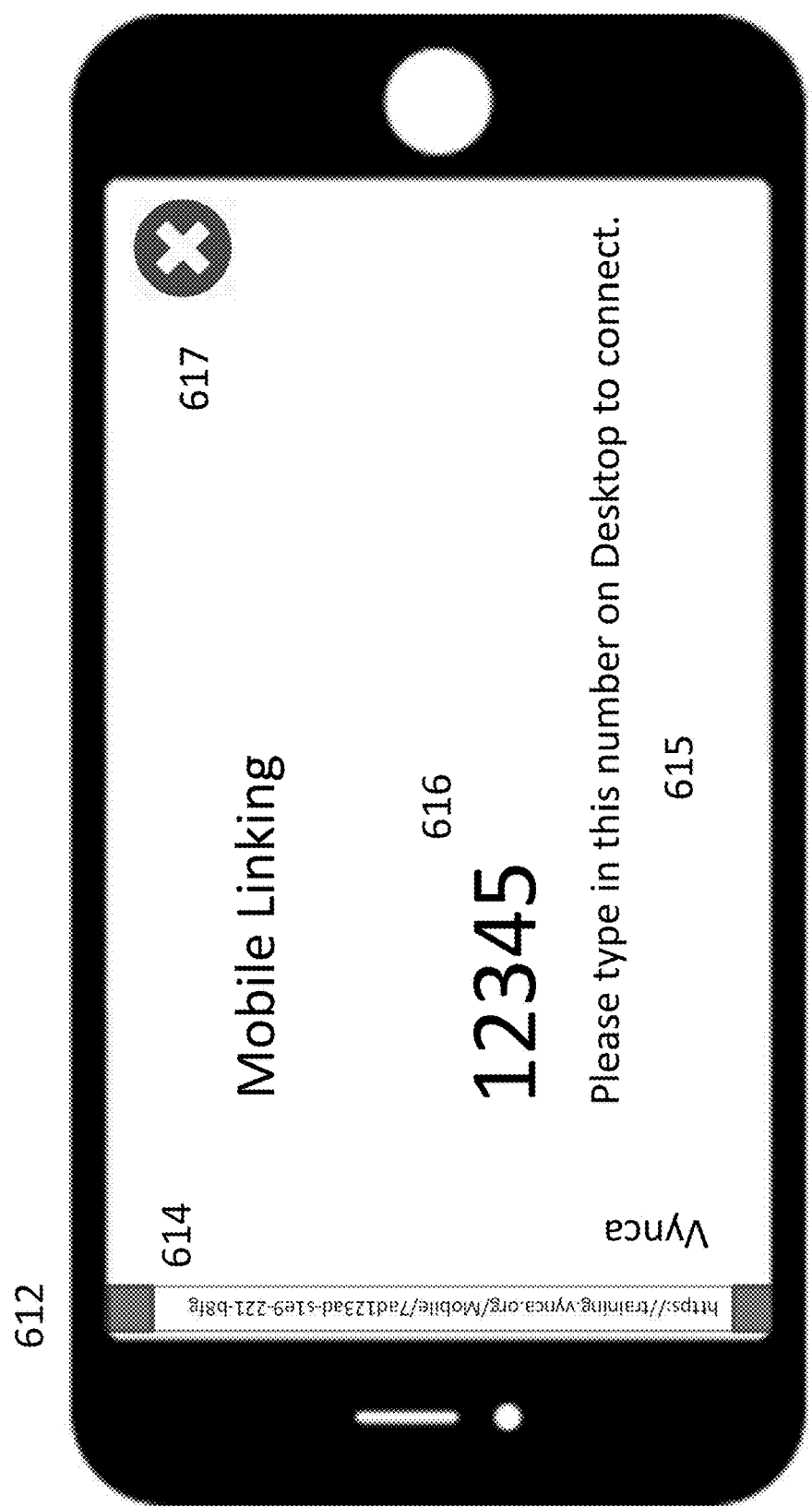
FIG. 6H depicts an exemplary workflow user interface, where a secure code is displayed on a mobile device or tablet, according to one embodiment.

FIG. 6H shows an exemplary user interface flow for linking a mobile device 612 to a first device, such as a desktop computer web session. The user interface is generated after clicking a link sent to the device 612 and may contain the secure web address for the session 614, user instructions 615, a secure linking code to be entered on the first device by the user 616, and a session close feature 617.

Figure 6I:
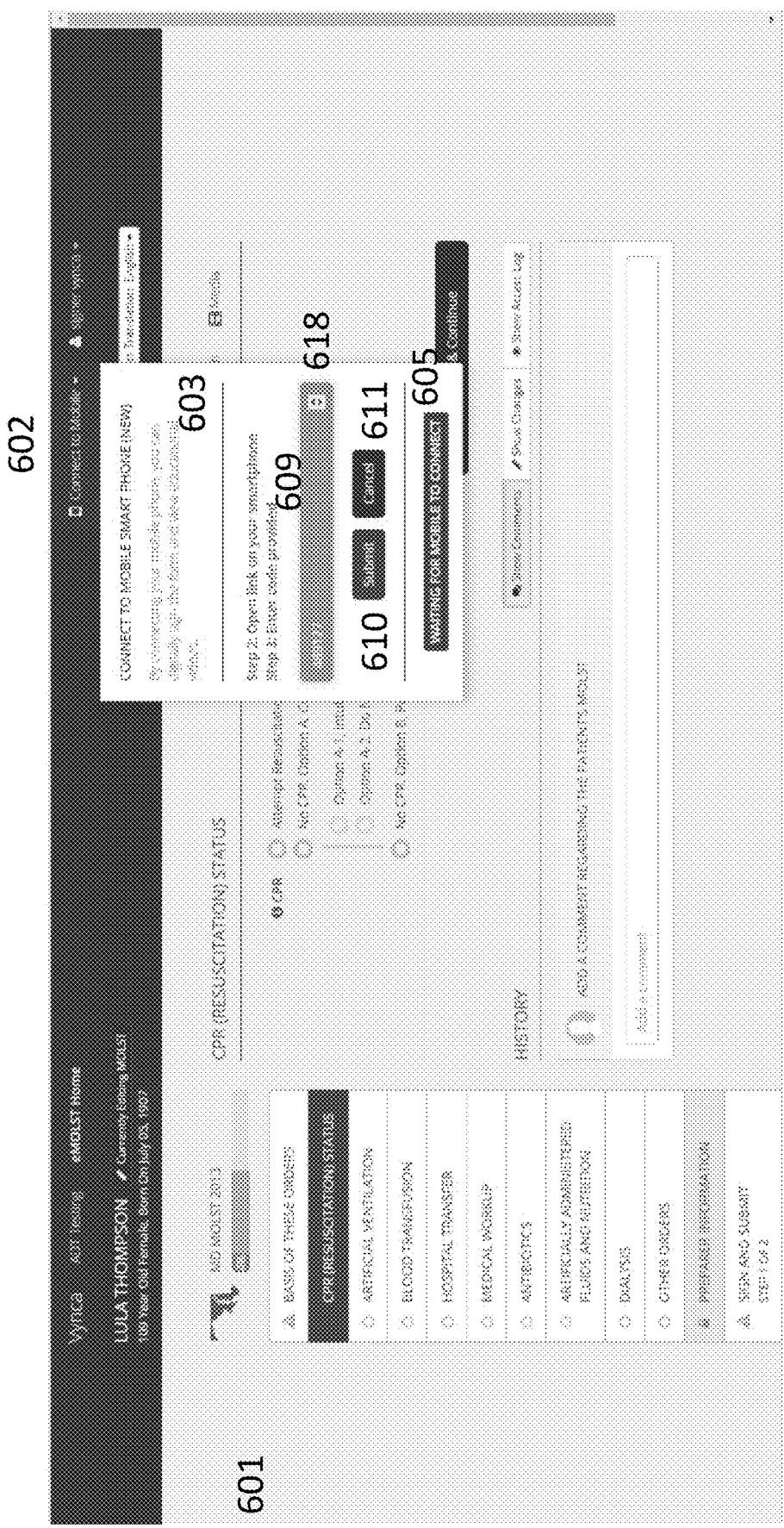
FIG. 6I depicts an exemplary linking workflow user interface for the user, where an alpha numerical code displayed on a second device is entered on a first device to link the devices in a web session, according to one embodiment.

FIG. 6I shows an exemplary user interface flow for an electronic documentation system 601 that contains a secondary device linking feature 602 that can be used to link a second device to the session on the cloud based electronic documentation system 601 running on a first device. In this embodiment, the linking feature 602 can be clickable to show an interacting window with instructions for how to link 603 a second device to the session on the first device. The instructions for how to link 603 may update as new steps in the process are needed. For instance, once a message has been sent to a second device with a link to access a code, that code can be added to the user interface code accept box 609 and submitted to link the session 610. In addition, if the user desires to send another link to a different device, they can click cancel 611 in order to input a new email or phone number to send a new message with a different code. The status indicator 605 will change if a link is live between a second device and a first device's session. The code may be added into the user interface code acceptance box 609, once the code is displayed and seen by the user on the second device user interface accessed through the link sent to that device.

Figure 6J:
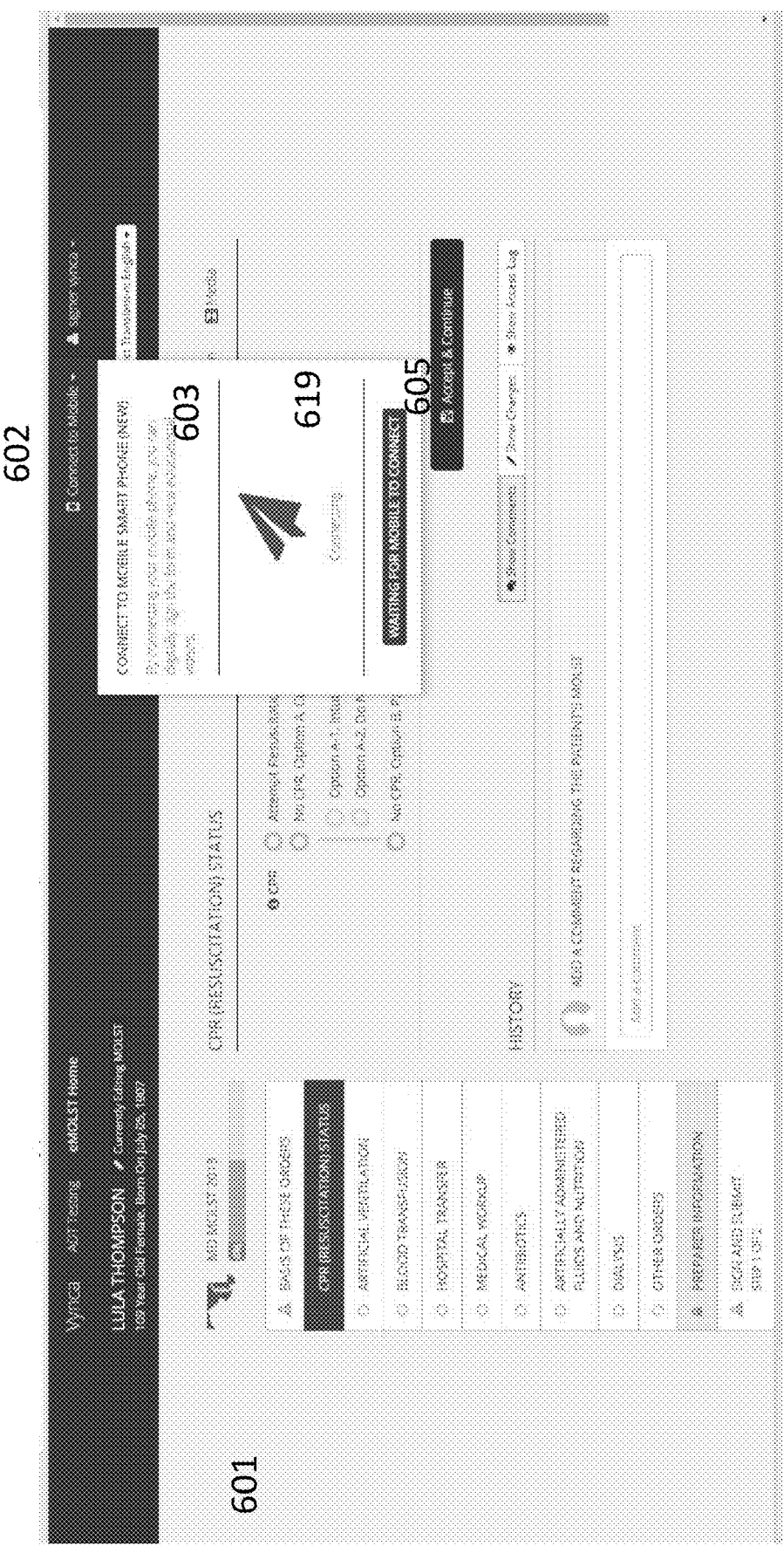
FIG. 6J depicts an exemplary linking workflow user interface for the user, where a status message indicating linking in progress is shown to the user, according to one embodiment.

FIG. 6J shows an exemplary user interface flow for an electronic documentation system 601 that contains a secondary device linking feature 602 that can be used to link a second device to the session on the cloud based electronic documentation system 601 running on a first device. In this embodiment, the linking feature 602 can be clickable to show an interacting window with instructions for how to link 603 a second device to the session on the first device. The instructions for how to link 603 may update as new steps in the process are needed. In addition or in combination, a status indicator 605 will change if a link is live between a second device and a first device's session, and a connection message 619 may be displayed to the user while a code is being validated to link the connection.

Figure 6K:
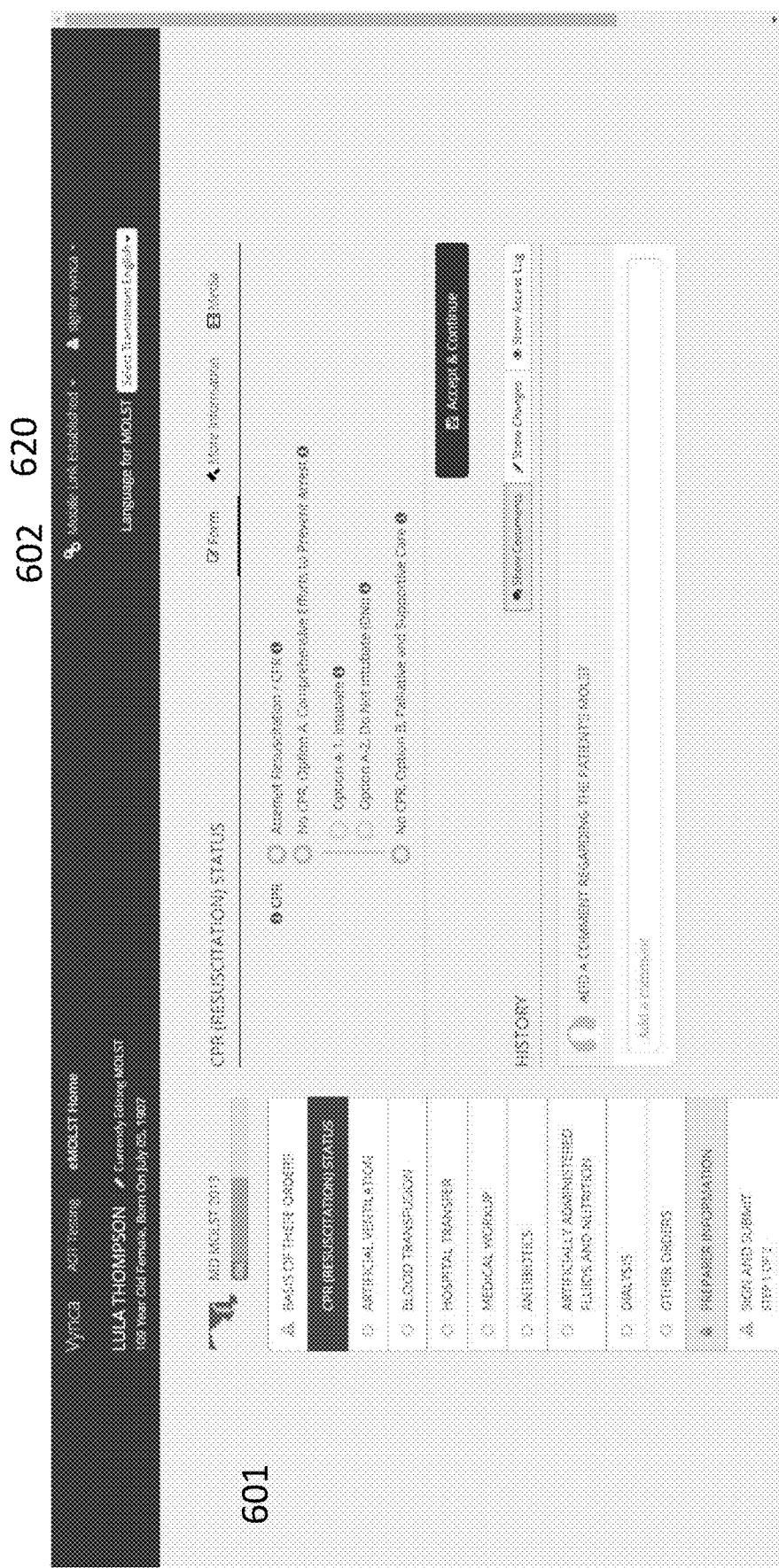
FIG. 6K depicts an exemplary linking workflow user interface for the user, where a link established indicator is displayed and the code input window is minimized after link is made, according to one embodiment.

FIG. 6K shows an exemplary user interface flow for an electronic documentation system 601 that contains a secondary device linking feature 602 that can be used to link a second device to the session on the cloud based electronic documentation system 601 running on a first device. In this embodiment, the linking features 602 can change to demonstrate to the user that a link was made 620.

Figure 6L:
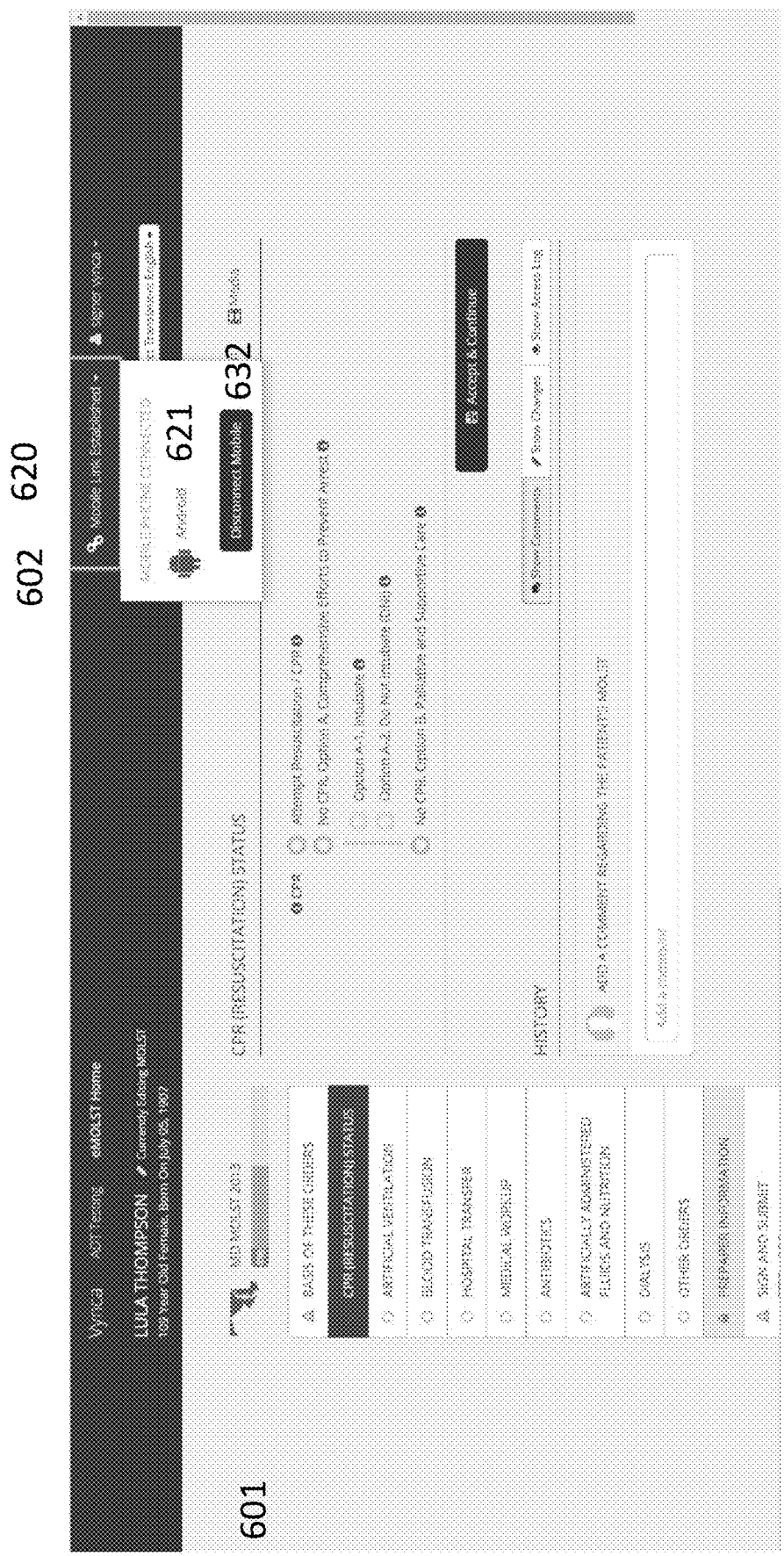
FIG. 6L depicts an exemplary linking workflow user interface for the user, where a link established indicator is displayed along with a window indicating the type of device or operating system linked an a disconnect link button, according to one embodiment.

FIG. 6L shows an exemplary user interface flow for an electronic documentation system 601 that contains a secondary device linking feature 602 that can be used to link a second device to the session on the cloud based electronic documentation system 601 running on a first device. In this embodiment, the linking features 602 can change to demonstrate to the user that a link was made 620. In some embodiments, with or without the linking feature being clicked 602, the user may be able to see what type of device is linked, through a device indicator icon 621. The user may also be able to disable the link with a disconnect feature 632.

Figure 6M:
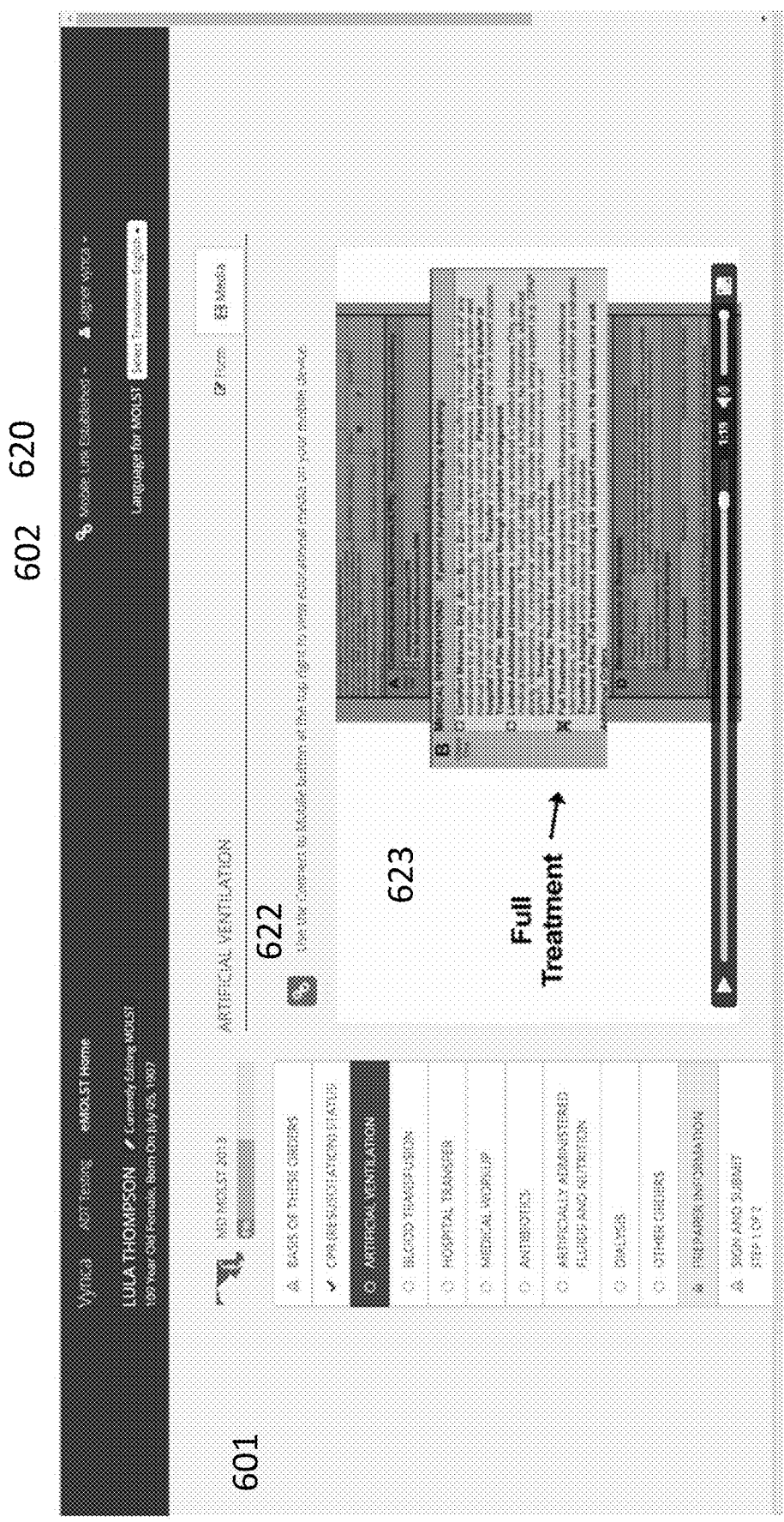
FIG. 6M depicts an exemplary linking workflow user interface for the user where a link established icon is displayed next to the linked feature on the first device that is accessible from the linked second device, according to one embodiment.

FIG. 6M shows an exemplary user interface flow for an electronic documentation system 601 that contains a secondary device linking feature 602 that can be used to link a second device to the session on the cloud based electronic documentation system 601 running on a first device. In this embodiment, the linking features 602 can change to demonstrate to the user that a link was made 620. In addition, in the user interface of the first device, where a link enabled feature is available 623, a feature specific linking icon 622 may be displayed. In embodiments where multiple linking features are shown on a page, the user may be able to select which linking feature to activate by clicking one or more of the feature specific linking icons 622.

Figure 6N:
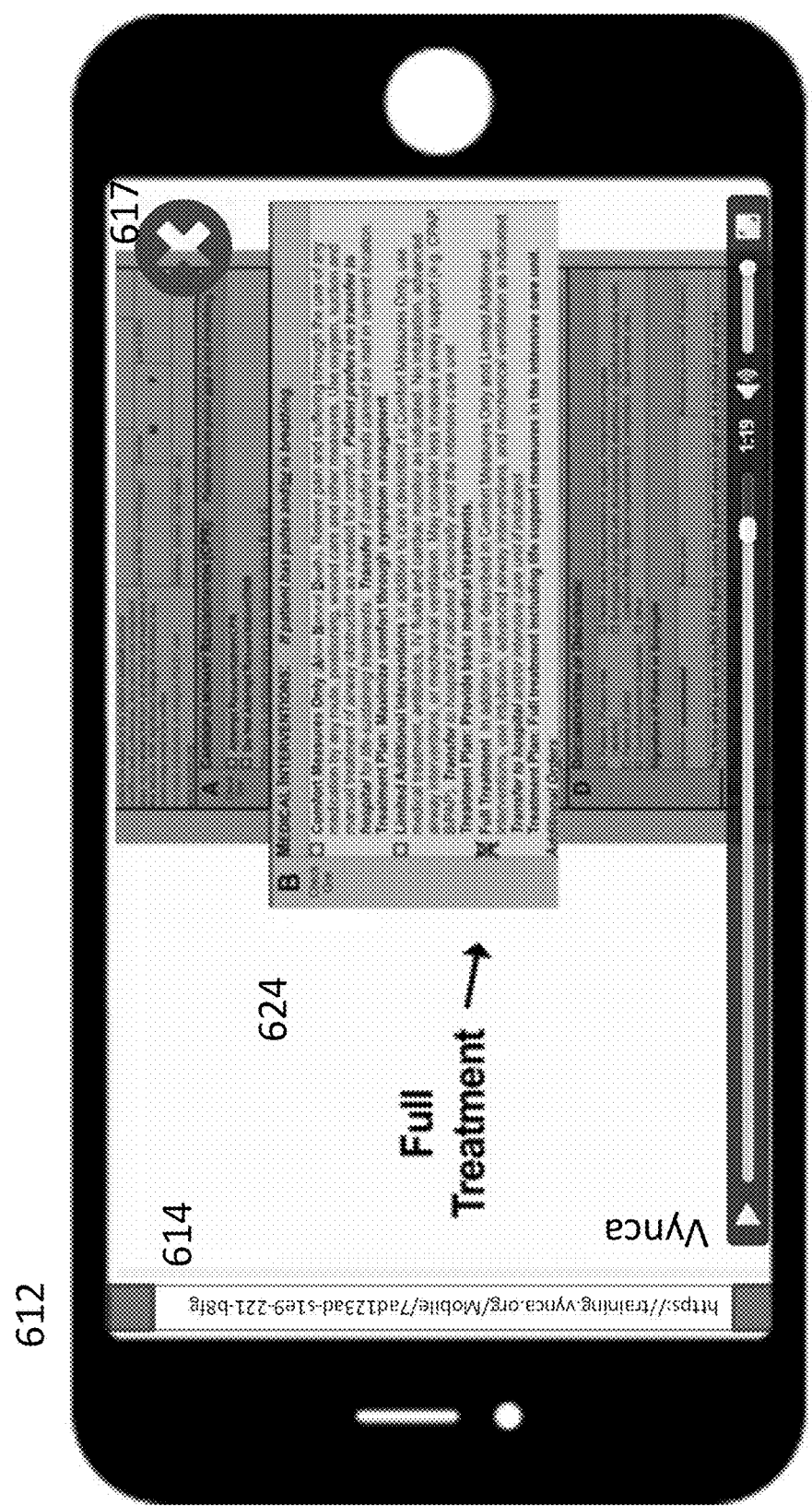
FIG. 6N depicts an exemplary linking workflow user interface after a device is linked where a linked video displayed on another device is displayed on the mobile device or tablet, according to one embodiment.

FIG. 6N shows an exemplary user interface on a second device or mobile device 612, after that device has been linked over a web session 614. The linked device now demonstrates a linked feature, such as one directional or dual video display 624. In some embodiments, the linking session may be disabled through a disable feature 617 on the mobile device 612.

Figure 6O:
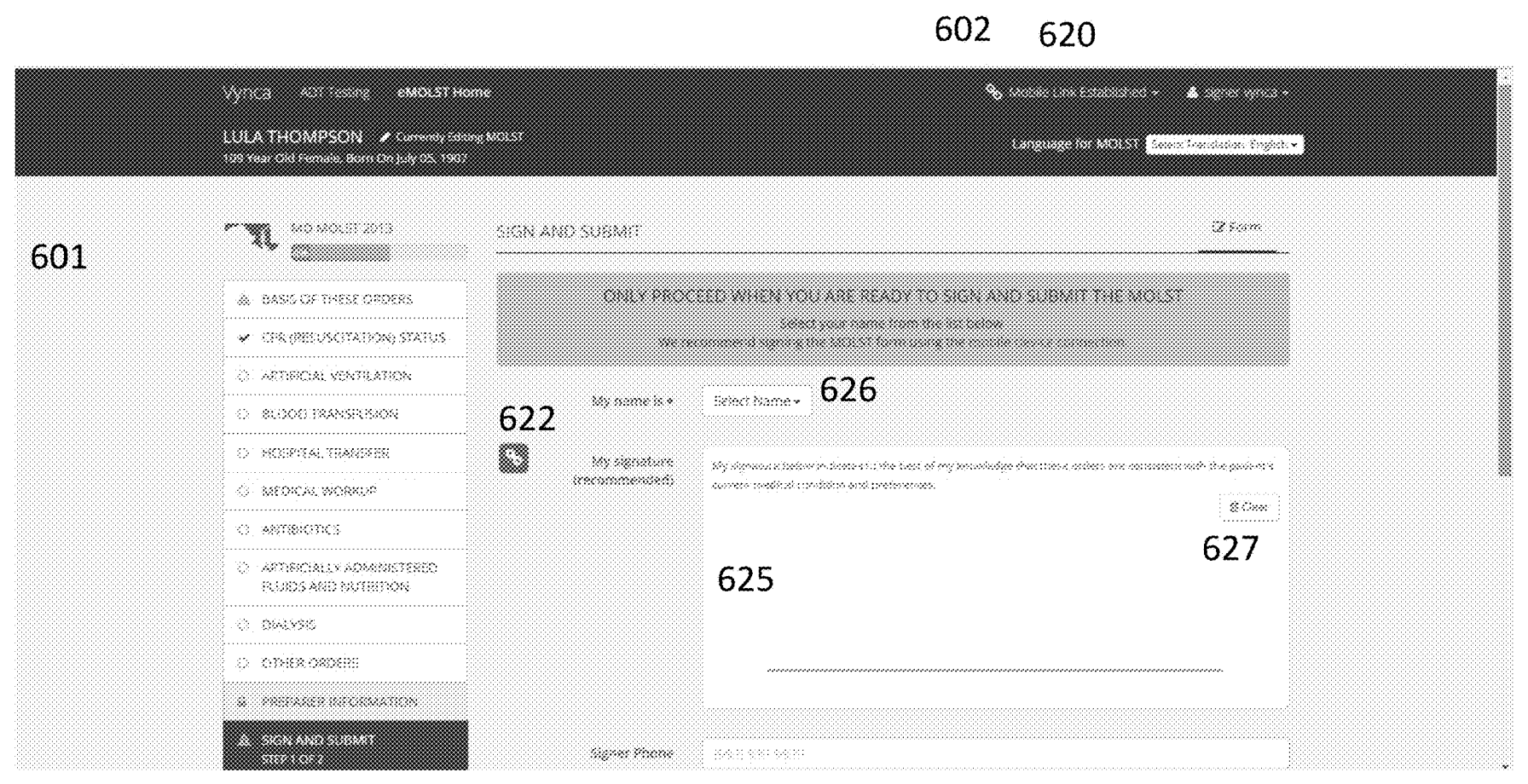

FIG. 6O shows an exemplary user interface flow for an electronic documentation system 601 that contains a secondary device linking feature 602 that can be used to link a second device to the session on the cloud based electronic documentation system 601 running on a first device. In this embodiment, the linking features 602 can change to demonstrate to the user that a link was made 620. An individual linking feature status indicator 622 may indicate the feature is active and linked. The feature may include, but is limited to, the capability to capture an electronic signature 625 and associate that signature with a set of pre-loaded or entered demographics 626. The electronic signature feature may also include the ability to clear the input on the first device only, second device only, or both devices 627.

Figure 6P:
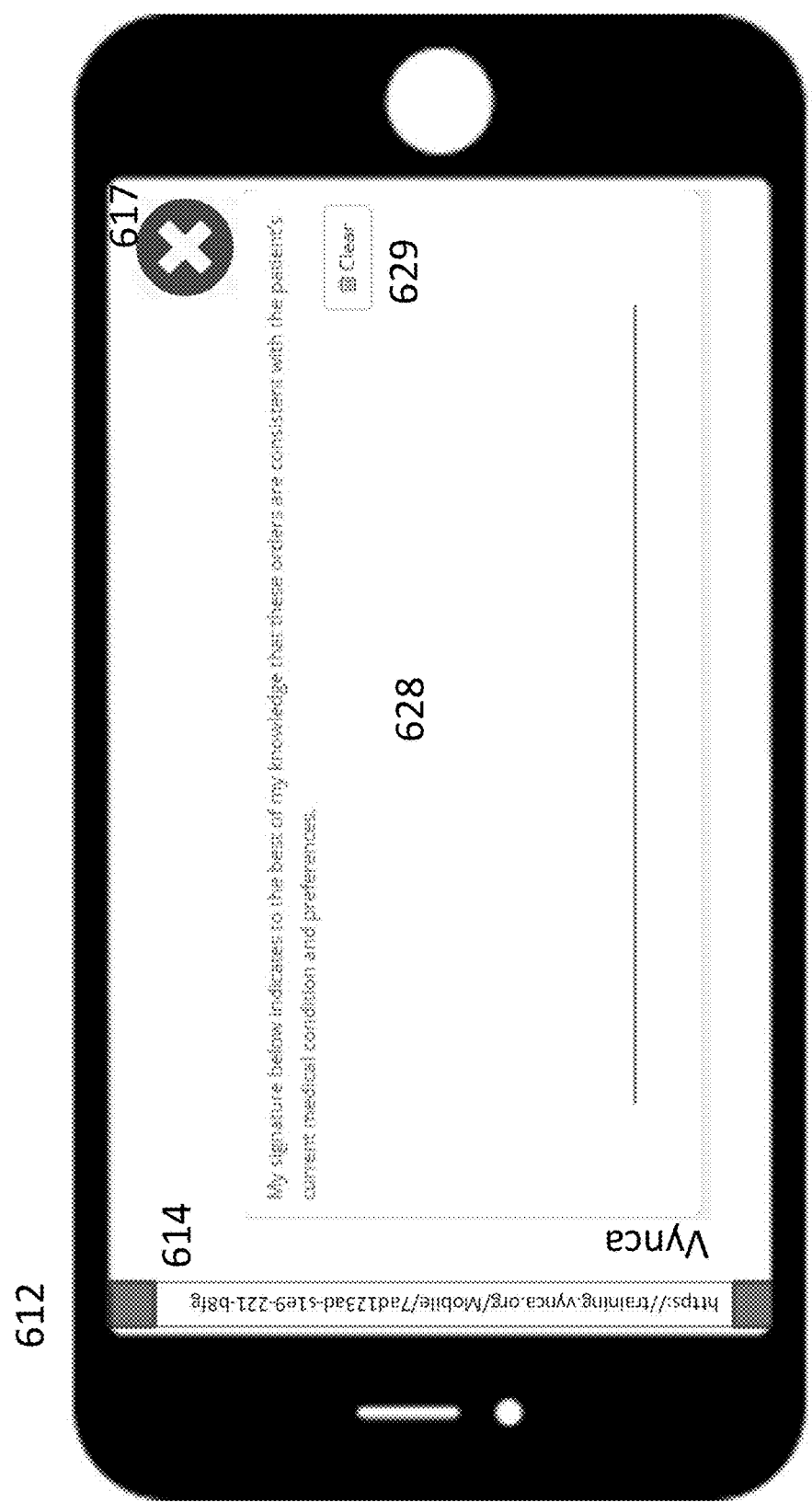
FIG. 6P depicts an exemplary linking workflow user interface after a device is linked, where an eSignature pad from one device is displayed through a link on the mobile device or tablet to capture a signature on the mobile device or tablet and display it on the first device, according to one embodiment.
Figure 6Q:
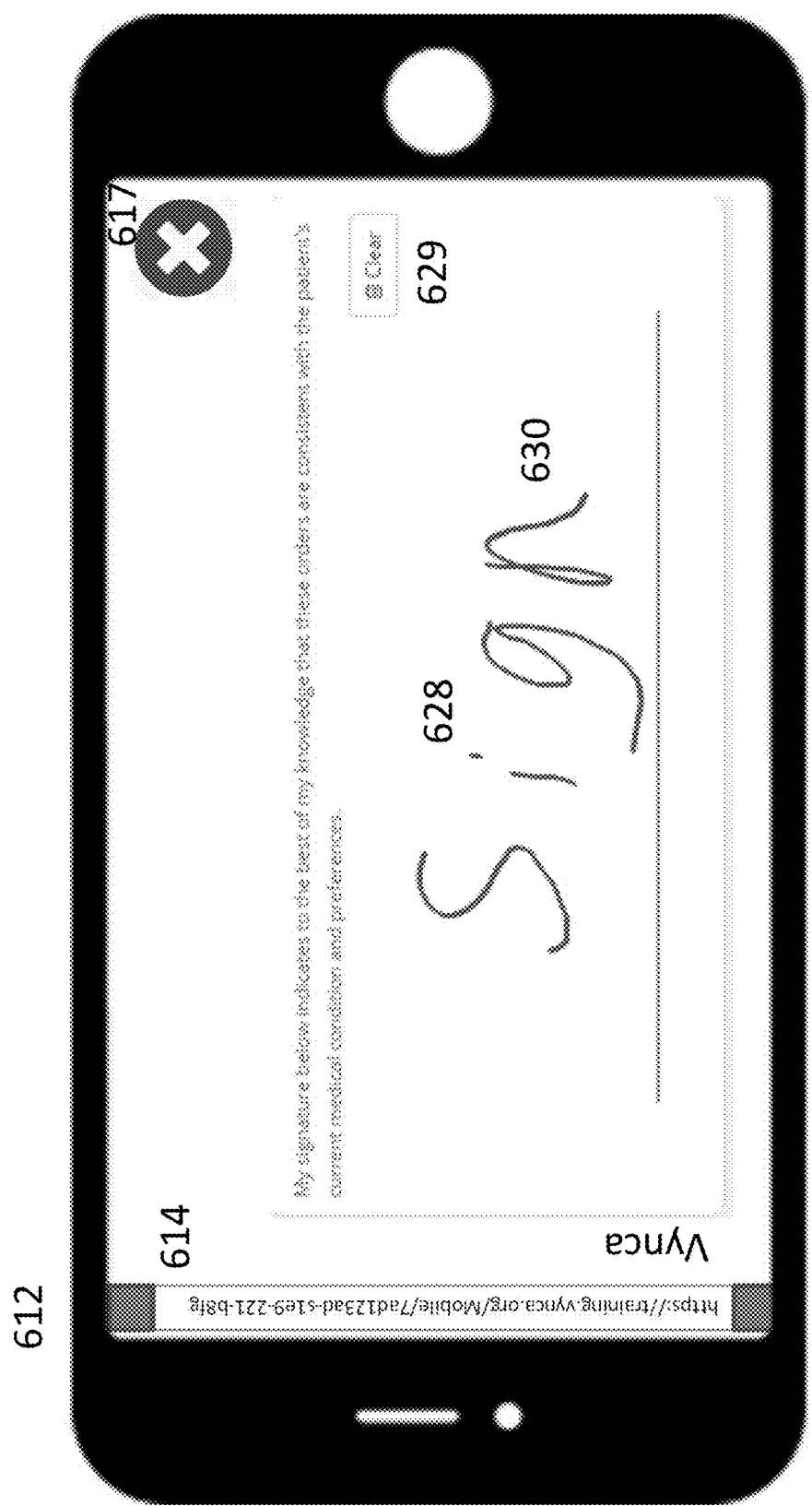
FIG. 6Q depicts an exemplary linking workflow user interface after a device is linked, where an eSignature pad from one device is displayed through a link on the mobile device or tablet to capture a signature on the mobile device or tablet and display it on the first device, according to one embodiment.

FIG. 6P shows an exemplary user interface on a second device or mobile device 612, after that device has been linked over a web session 614. The linked device now demonstrates a linked feature, such as an electronic signature entry area 628, where the user would use their finger, stylus, or other mechanism to write an electronic signature on the second device 612 that would be input to a web form on the first device. The electronic signature may also be cleared or erased by the user, in some embodiments, for example by clicking a clear icon 629. In some embodiments, the user may also be required to click an accept signature button when they are done signing. The linking session may be disabled, in some embodiments, through a disable feature 617 on the mobile device 612. FIG. 6Q shows the device of FIG. 6P, with a signature 630 shown in the signature entry area 628.

Figure 6R:
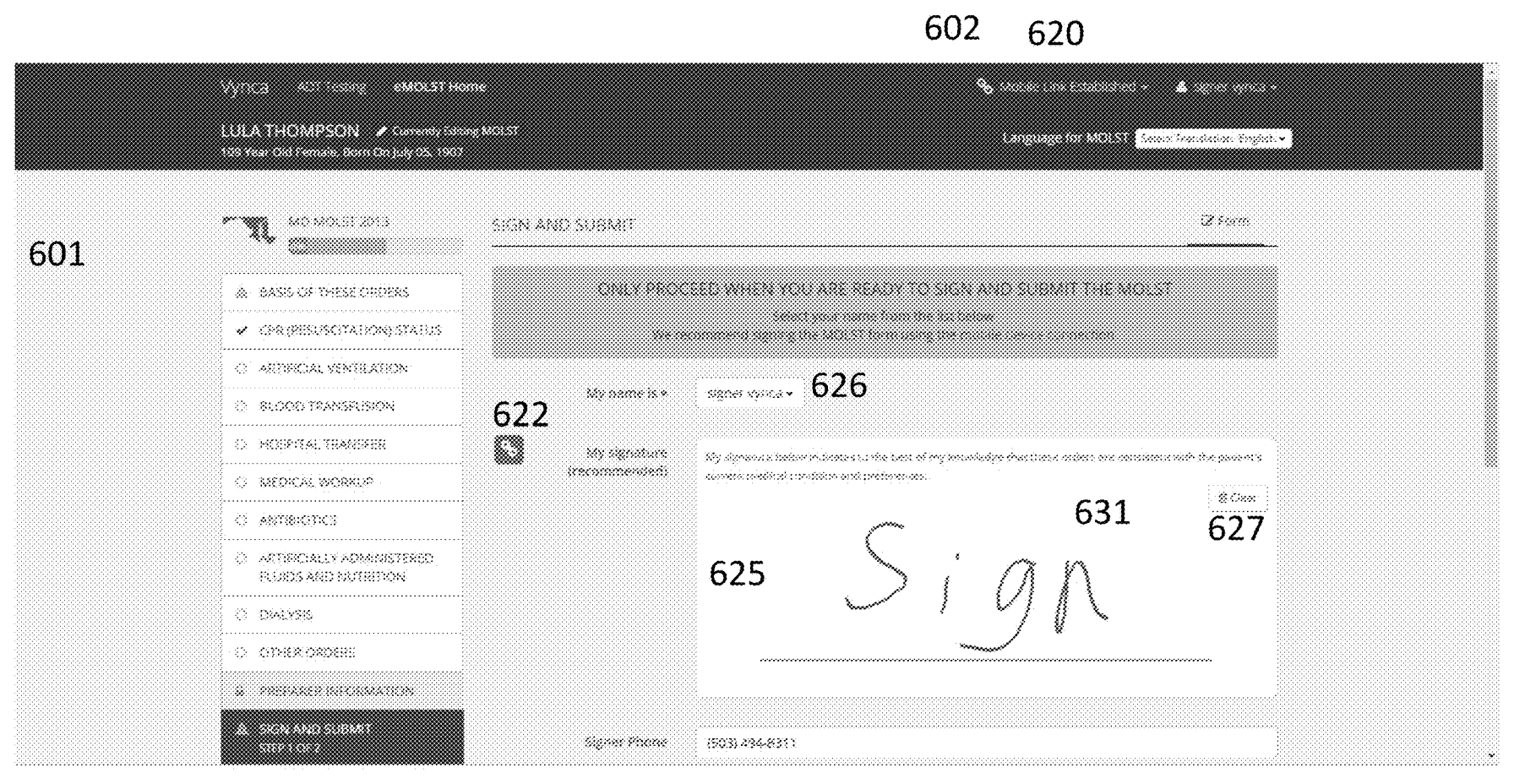

FIG. 6R shows an exemplary user interface flow for an electronic documentation system 601 that contains a secondary device linking feature 602 that can be used to link a second device to the session on the cloud based electronic documentation system 601 running on a first device. In this embodiment, the linking features 602 can change to demonstrate to the user that a link was made 620. An individual linking feature status indicator 622 may indicate that the feature is active and linked. The feature may include, but is not limited to, the capability to capture an electronic signature 625 and associate that signature with a set of pre-loaded or entered demographics 626. The electronic signature feature may also contain the ability to clear the input on the first device only, second device only, or both devices 627. An electronic signature 631 may be added by a user at the first device, using a touch screen, mouse, or other mechanism. Alternatively, the electronic signature 631 may be added by the user, using a second device, and the second device may send the electronic signature image 631 to the server to be displayed on the first device.

Figure 6S:
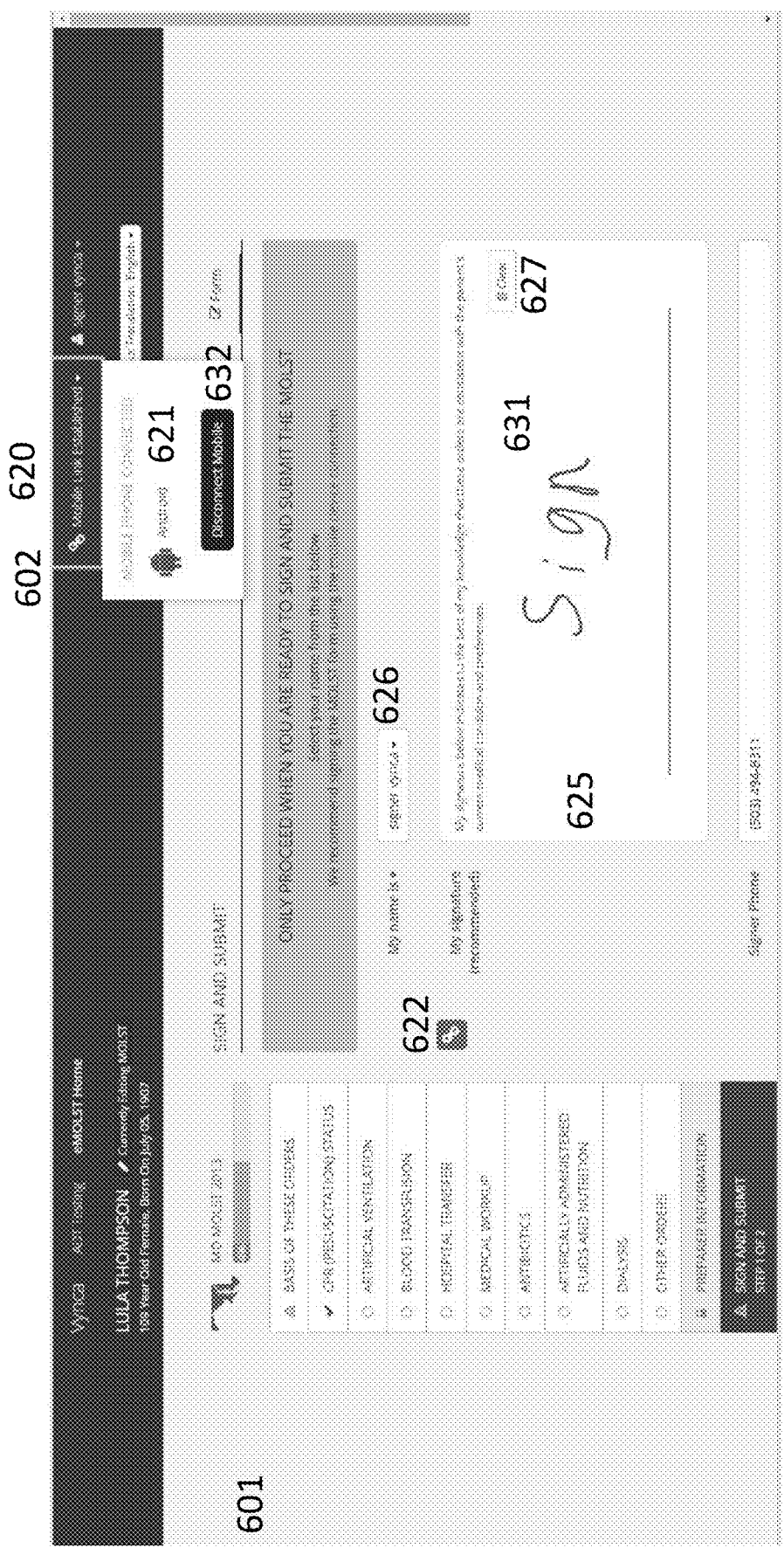
FIG. 6S depicts an exemplary linking workflow user interface for the user, where a disconnect linked device button is activated, according to one embodiment.

FIG. 6S shows an exemplary user interface flow for an electronic documentation system 601 that contains a secondary device linking feature 602 that can be used to link a second device to the session on the cloud based electronic documentation system 601 running on a first device. In this embodiment, the linking features 602 can change to demonstrate to the user that a link was made 620. An individual linking feature status indicator 622 may indicate that the feature is active and linked. The feature may include, but is not limited to, the capability to capture an electronic signature 625 and associate that signature with a set of pre-loaded or entered demographics 626. The electronic signature feature may also contain the ability to clear the input on the first device only, second device only, or both devices 627. Whereas an electronic signature 631 may be added by a user at the first device using a touch screen, mouse, or other mechanism or where as an electronic signature 631 may be added by the user using a second device and the second device sending the electronic signature image 631 to the server to be displayed on the first device. In some embodiments, with or without the linking feature being clicked 602, the user may be able to see what type of device is linked, through a device indicator icon 621. The user may also be able to disable the link with a disconnect feature 632.

Figure 6T:
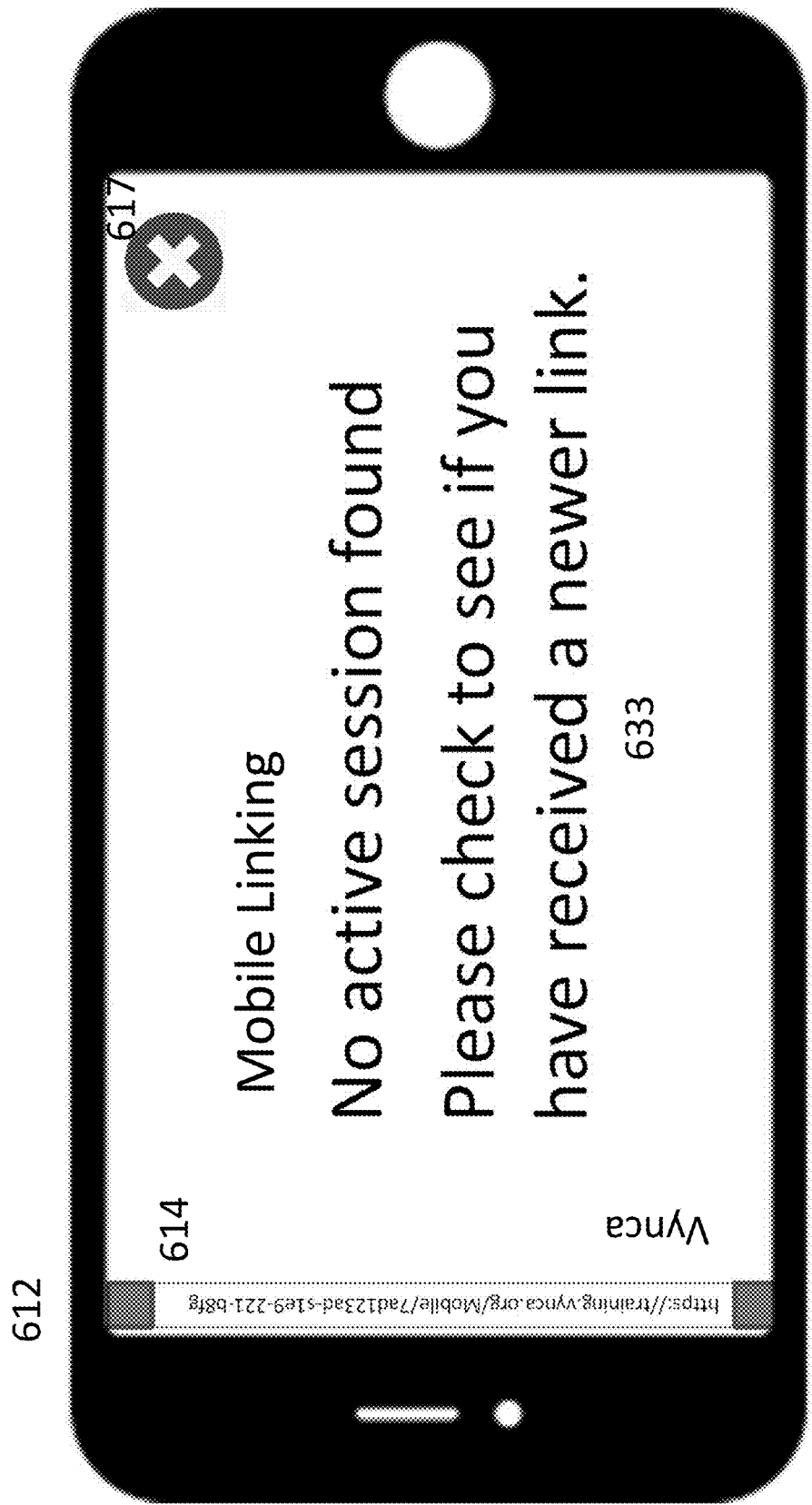
FIG. 6T depicts an exemplary linking workflow user interface for a second device sign out screen after the link session with a first device has ended, according to one embodiment.

FIG. 6T shows an exemplary user interface on a second device or mobile device 612, after the device 612 has been linked over a web session 614. The linking session being able to be disabled through a disable feature 617 on the mobile device 612, such that once disabled the mobile session will display a link disconnect message 633.

Figure 6U:
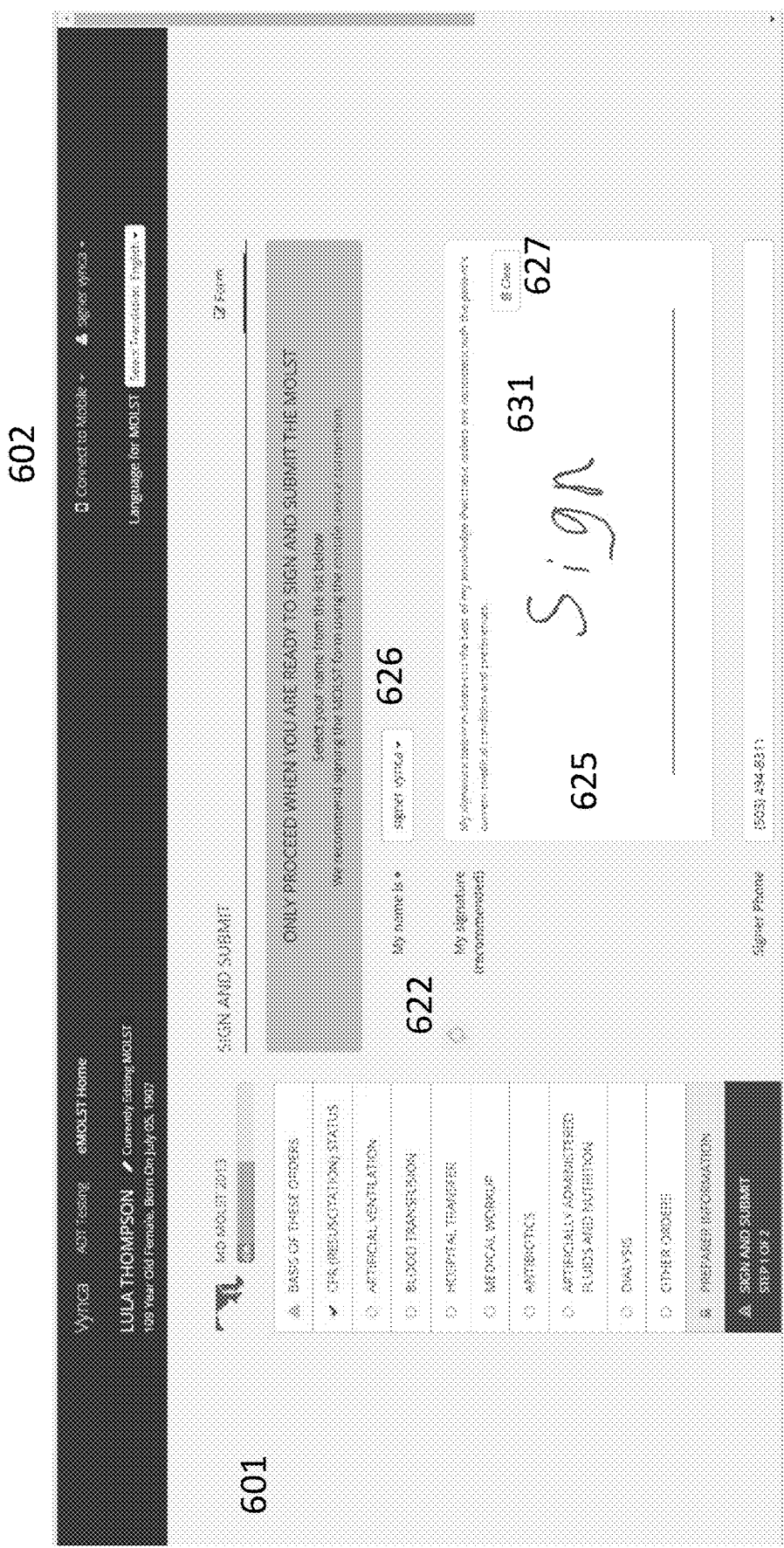
FIG. 6U shows an exemplary user interface flow for an electronic documentation system that includes a secondary device linking feature that can be used to link a second device to the session on the cloud based electronic documentation system running on a first device.

FIG. 6U shows an exemplary user interface flow for an electronic documentation system 601 that includes a secondary device linking feature 602 that can be used to link a second device to the session on the cloud based electronic documentation system 601 running on a first device. In this embodiment, the linking features 602 can change after a link was made back to a non-linked status 602 asking to re-link if needed. An individual linking feature status indicator 622 may indicate the feature is active or not active. The feature may include but may not be limited to the capability to capture an electronic signature 625 and associate that signature with a set of pre-loaded or entered demographics 626 which are stored and available even after a link was disabled. The electronic signature feature may also contain the ability to clear the input on the first device only after a link has been disabled 627. An electronic signature 631 may be added by a user at the first device, using a touch screen, mouse, or other mechanism, in the event that there is no active link with a second device.

Figure 7:
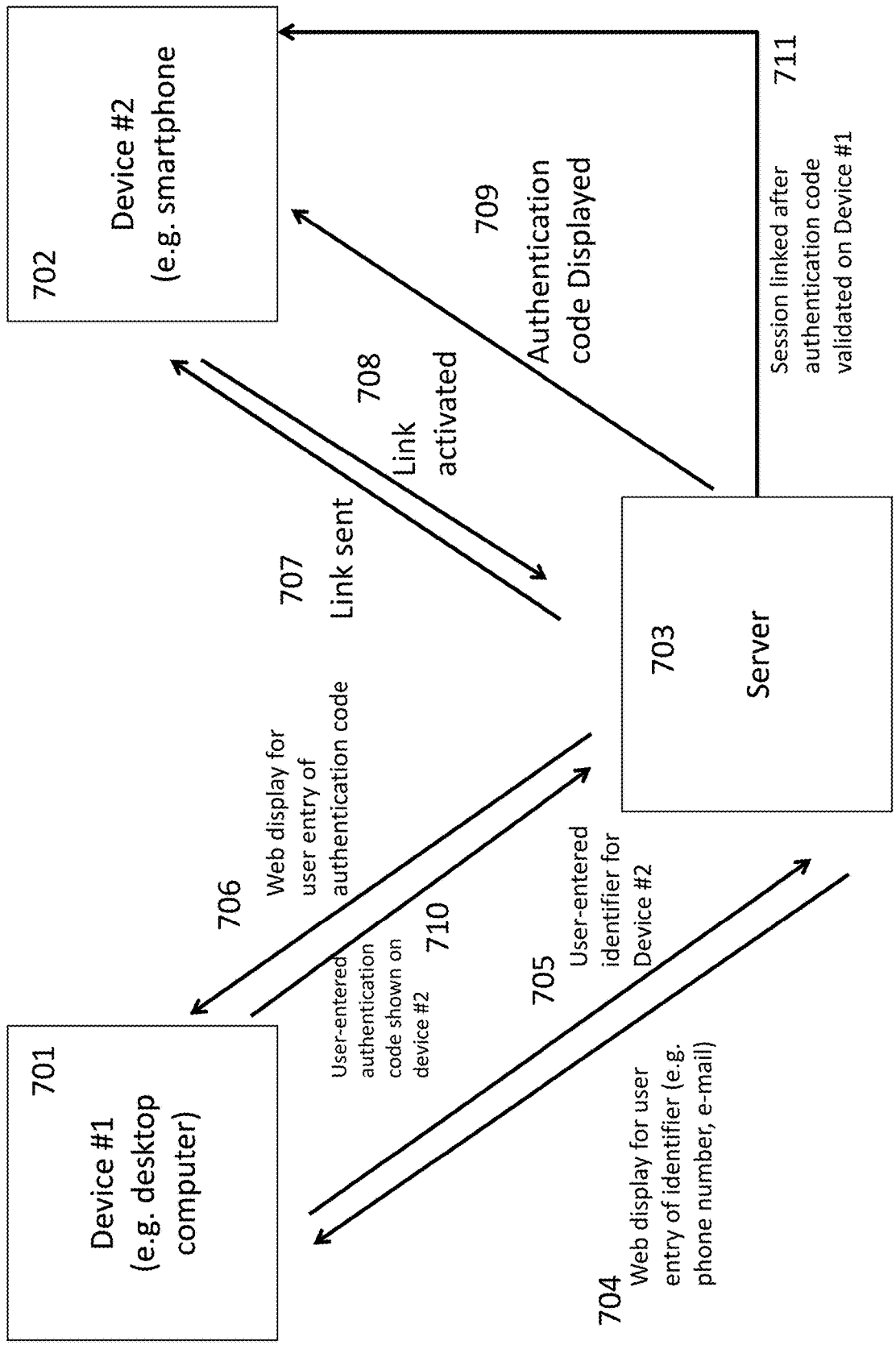
FIG. 7 depicts an exemplary linking workflow diagram demonstrating the data flow between Device #1, Server, and Device #2 at each step, according to one embodiment.

FIG. 7 shows an exemplary data process flow for linking a first device 701 with a second device 702 over a server session 703. In a first step, a user would access a web display on a first device 701 for entering a second device 702 identifier 704. When the second device 702 identifier 704 is entered, a message is sent 705 to the server 703, which then sends a link 707 to a second device 702 for the user to activate 708. When the second device 702 identifier 704 is sent to the server 703, the server 703 will also change the web display on the first device 701, to allow for user entry of the authentication code 706. Once the link 708 is activated by the user of the second device 702, the server 703 displays an authentication code 709 to the user of the second device 702, and user then manually enters the authentication code on the first device 701 user interface. The first device 701 would then send the user entered code 710 to the server 703 for validation. Once the code is validated, the server 703 would activate the session link 711 between the first device 701 and second device 702 over the network.

Figure 8:
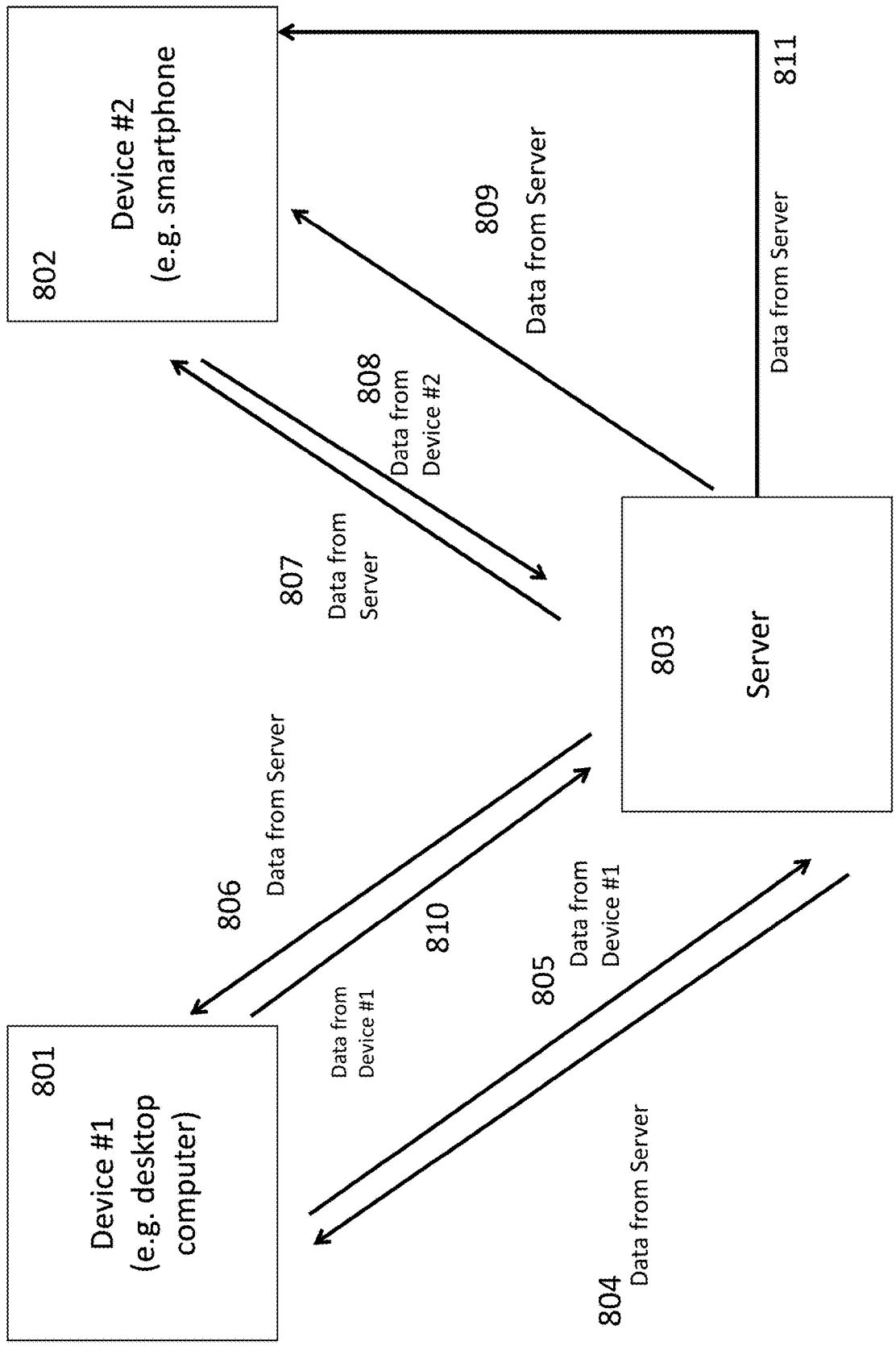
FIG. 8 depicts an exemplary linking workflow diagram demonstrating the data flow between Device #1, Server, and Device #2 at each step, according to one embodiment.

FIG. 8 shows an exemplary data flow diagram demonstrating data flowing from a first device 801 after user input 804 to a server 803 and then the server sending data to adjust the user interface to the first device 806 and also the server 803 sending an access link 807 to a second device 802. The access link 807 may be activated by the user of the second device 802 or may be activated automatically by the second device 802. The server 803 sends the user interface on the second device 802 the authentication code from the server 809. Then the user of the second device 802 manually enters data on the first device 801, which sends the data from the entered code 810 to the server 803. Then the server links the session by sending data 811 to the second device 802 and/or the first device 801 to establish a linked web session.

Figure 9:
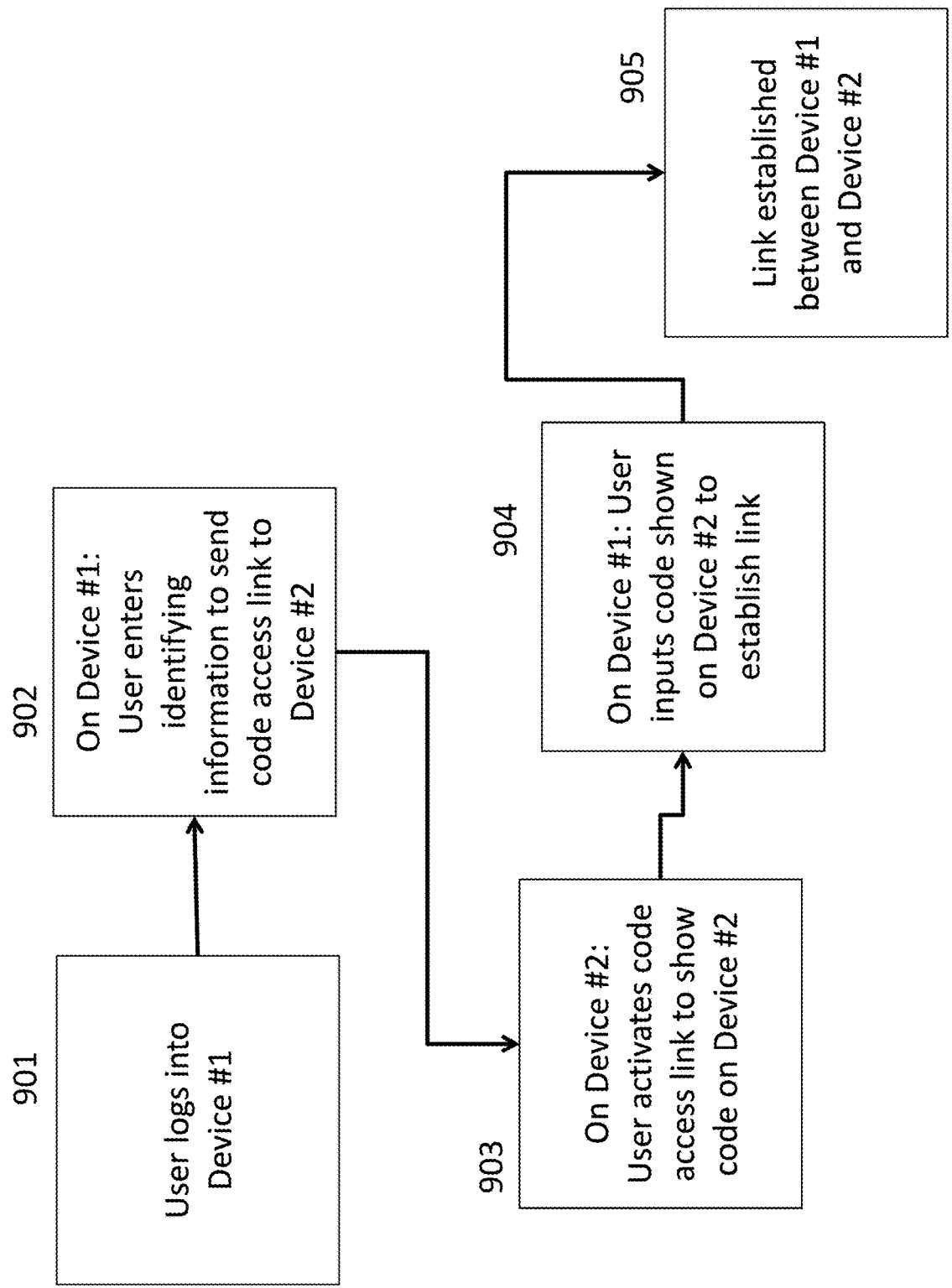
FIG. 9 depicts an exemplary linking workflow to link device #1 with device #2, according to one embodiment.
Figure 10A:
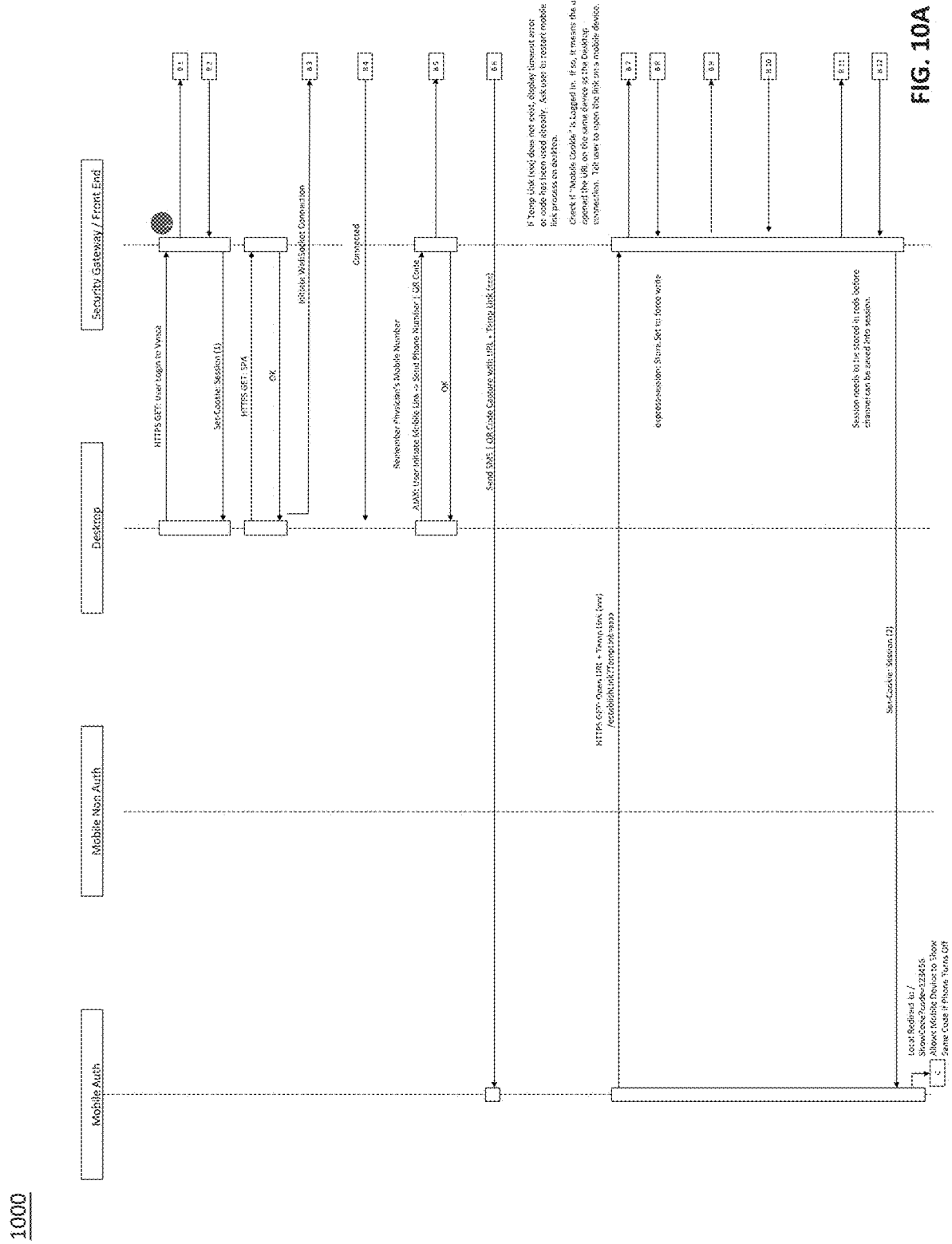
FIGS. 10A-10D illustrate an example link architecture sequence diagram for a system and method for linking a mobile device and a desktop device, according to one embodiment.
Figure 10B:
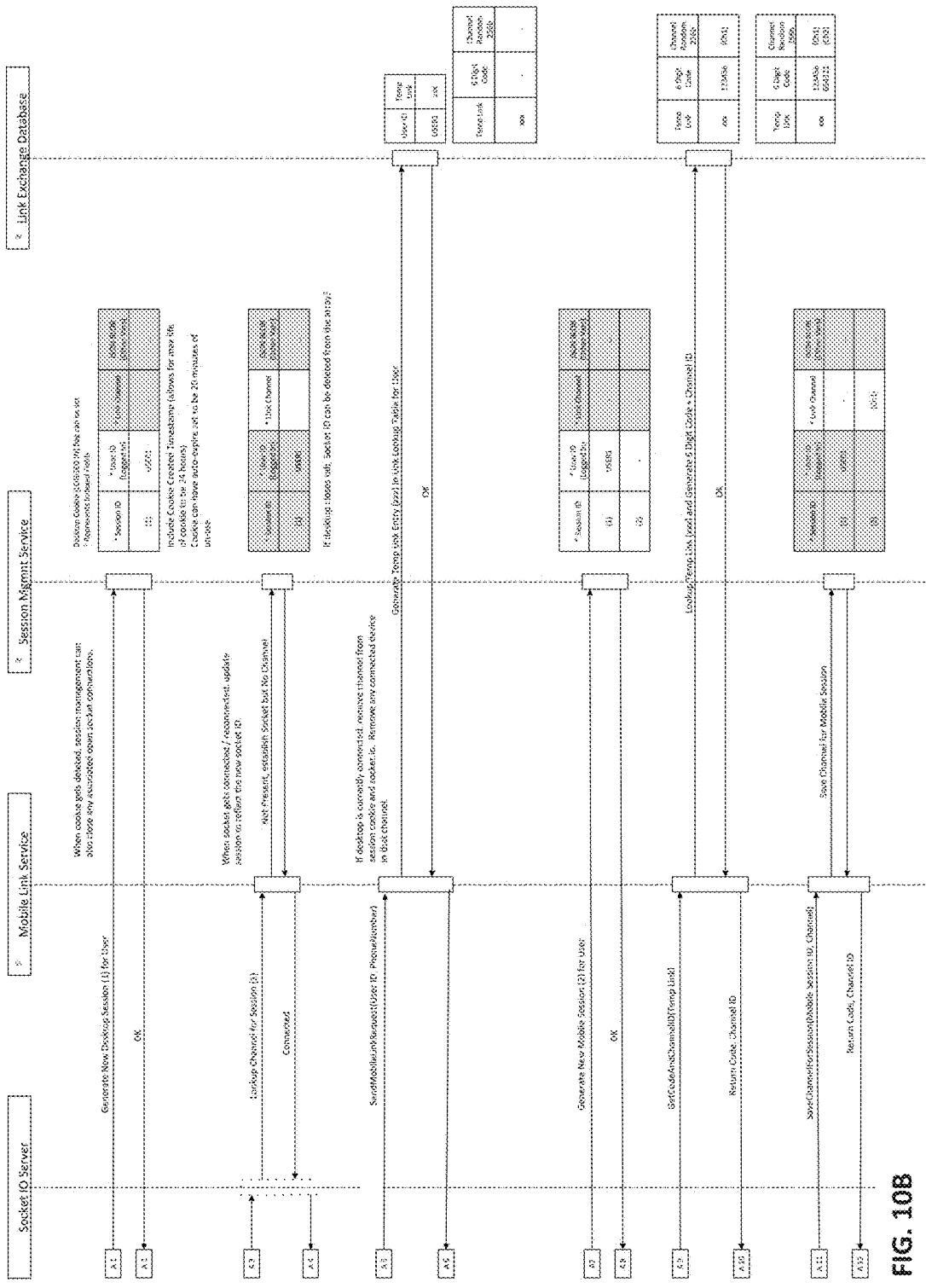
Figure 10C:
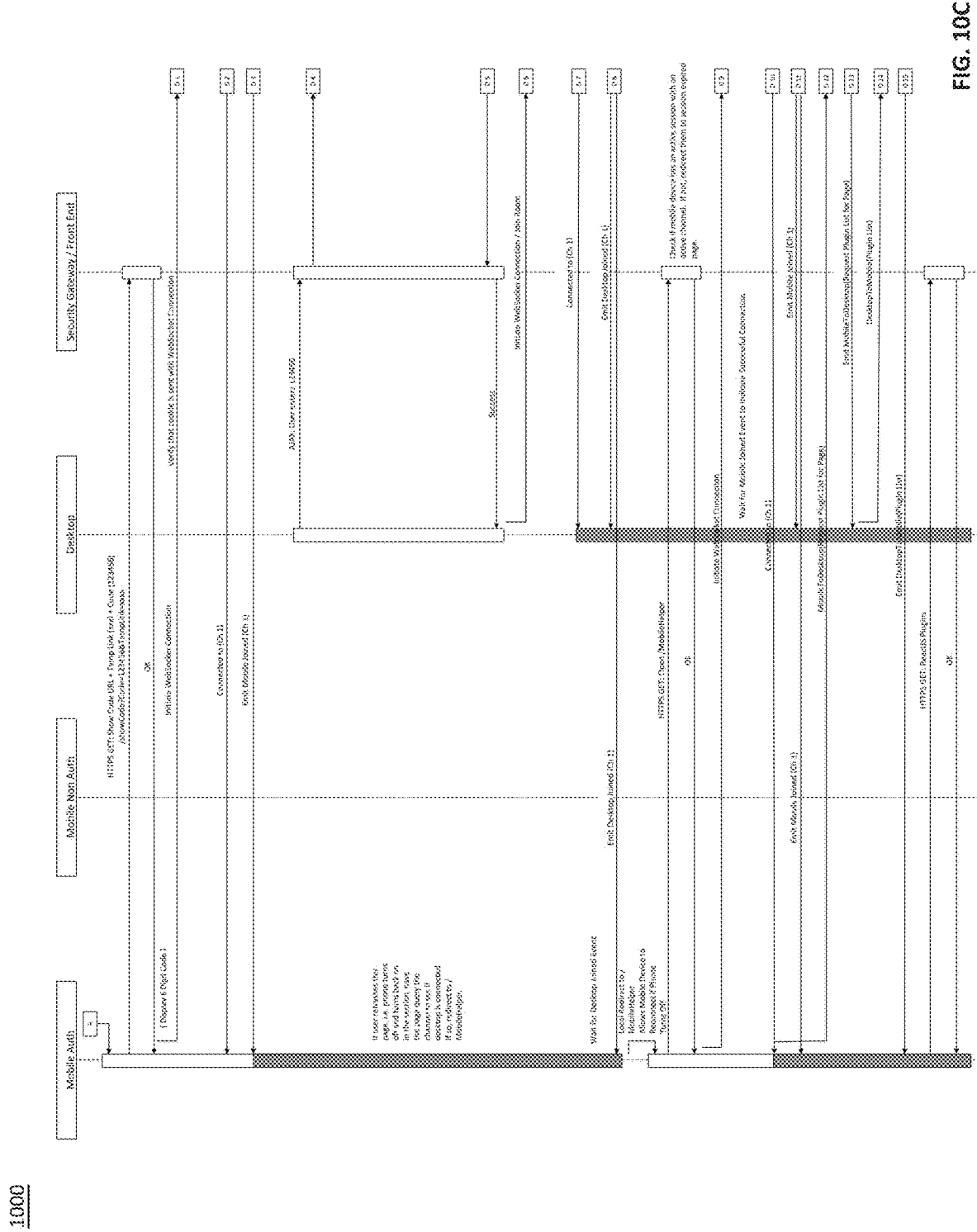
Figure 10D:
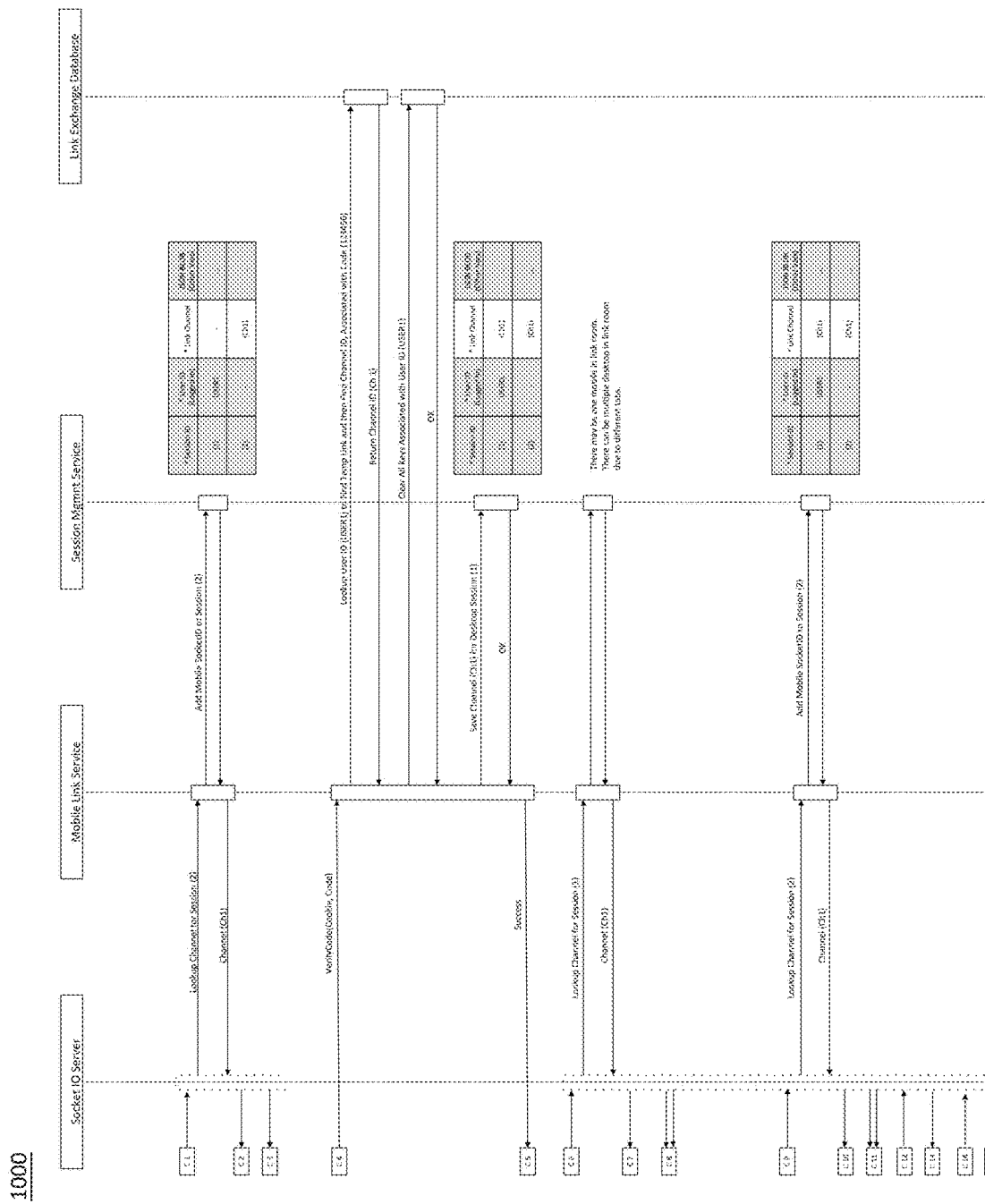

FIG. 9 shows an exemplary user workflow, where a user logs into a first device 901 and enters data on a first device to identify a destination of a message to be sent to an access point on a second device 902. Then the user activates the link sent in a message to show a code on the second device 903. Then the user would input the code shown on the second device on the first device 904, and once the code is verified, the link between the first and second devices is established 905.

FIGS. 10A-10D illustrate an example link architecture 1000 sequence diagram for a system and method for linking a mobile device and a desktop device. One or more of the previous described embodiments may be implemented using the link architecture 1000. The architecture 1000 can be implemented using any of a variety of programming languages or techniques, including but not limited to ReactJS and JavaScript.

The architecture 1000 can be configured to have higher trust in a desktop device than a mobile device. This can be done for security purposes, and it leverages the trust of the desktop computer. For example, when this example is implemented in a hospital, the desktop computer can be a computer managed by the hospital according to high security standards (e.g., in order to comply with HIPAA or other regulations).

One way the link architecture 1000 can improve security is to have the mobile device join a linking session first, and then have the desktop computer join the session after. If the desktop were to join the session first and then the mobile device joined later, then a malicious party may join the session with the desktop computer, which can cause security concerns for the desktop computer. By having the desktop join the existing, known session, security is improved.

Another improvement made by the architecture 1000 involves the generating of a pairing code (e.g., a six digit code to be displayed on the mobile device for entry on the desktop), until after a user accesses a hyperlink. When the user accesses the link, it creates a new session for that user, which includes generating one or more codes and a channel ID.

Another improvement is the ability to account for link previews. Apple iOS and Google Android operating systems can be configured to perform link previews, whereby the operating system accesses the link and provides a preview of the content on the other side of the link for the viewer. If the link is configured to only generate one code (e.g., for security purposes), then the user may be unable to receive a code, because the link preview process already caused a code to be generated by accessing the link for the preview. In this manner, the link preview burns the code meant for the user. One way to address this problem is to use static links that generate the same code each time the link is accessed. However, that would cause security issues as well. One solution illustrated by the architecture 1000 is for the system to generate multiple codes (e.g., five codes) that are associated with the link. Then, each time the link is accessed, a subsequent pre-generated code is provided. In this manner, the link preview can burn the first code, and the system still has a code to provide to the user.

After the link is accessed by the user, the code is displayed on the mobile device screen. At the desktop, the user is prompted to enter the code displayed on the mobile device screen. Once the code is entered at the desktop, the system can look up that code for that link and then know which channel that mobile device is on. With the channel known, the desktop connects to the channel. An identifier of the session may be stored in a database for later retrieval.

In some embodiments, the channel IDs associated with the session can be saved for later use. For example, a system can perform background tasks and notify both the desktop and mobile devices using the channel IDs. For example, for some processor intensive tasks, such as photo processing, the task can be performed in the background with the devices notified once the task is complete, without needing to refresh the session. In some embodiments, this can be performed as part of a queue-based system, where a worker process can make a call to the mobile link service.

In one embodiment, a user can take a photo of a document using the mobile device. The photo is uploaded to a server for a worker to process in the background. The worker process can determine whether anything is missing in the document (e.g., a signature). The worker process can then send a message to the mobile device, which may show a signature field for example. The user can provide a signature in the signature field on the mobile device, which would then show up in a corrected version of the document on the desktop device. In an alternative embodiment, a process may be employed such that a user can take a picture of a driver's license, and the worker process can extract information from the license and use that information to fill in fields in a form (e.g., a user's name and address). In some embodiments, if a user is actively using the mobile device, the device can send a signal through the session to prevent the desktop device from automatically logging off—the presumption being that if a user is actively using the mobile device and the link session is still active, then the user may want to return to the desktop relatively soon.

In one embodiment, the architecture 1000 can be configured such that the mobile device does not send data directly to a backend server. For example, a webpage can be shown on both the desktop computer and a mobile device. If a user checks a check box on a mobile device, then the check box is checked on the desktop computer (rather than a backend server) and then the desktop computer sends a signal to the server indicating that the checkbox has been checked. This can be especially useful in the medical context, where, to determine whether a document is valid, a physician may need to approve it, which is done on the secure desktop rather than the potentially insecure mobile device.

Although the above description of various embodiments and aspects is believed to be complete, any given embodiment may have a number of alternations, different features and different combinations than those described above, without departing from the scope of the invention. The above description is intended to be exemplary in nature and not exhaustive. Thus, the description should not be interpreted as narrowing the scope of the invention as it is described in the claims.

What is claimed is:

1. A method for linking a desktop computer with a mobile device, the method comprising:
   receiving a send mobile link request from a desktop computer, the send mobile link request comprising a mobile device identifier;
   generating a link;
   sending the link to a mobile device associated with the mobile device identifier, using the mobile device identifier;
   receiving an indication that the link was activated;
   generating multiple codes and a channel ID, in responsive to the received indication;
   providing a first code of the multiple codes to the mobile device and initiating a communication protocol using the channel ID, in response to a code request from the mobile device, wherein the first code is provided to be entered at the desktop computer;
   connecting the mobile device to a communication channel associated with the channel ID using the communication protocol;
   receiving the first code from the desktop computer;
   retrieving the channel ID using the first code from the desktop computer;
   responsive to retrieving the channel ID using the first code, invalidating the multiple codes; and
   connecting the desktop computer to the communication channel associated with the channel ID using the communication protocol, thereby linking the desktop computer with the mobile device.

2. The method of claim 1, wherein the desktop computer is a notebook computer.

3. The method of claim 1, wherein the mobile device identifier is a telephone number or email address.

4. The method of claim 1, further comprising:
   receiving a signature from the mobile device; and
   providing the received signature for display at the desktop computer.

5. The method of claim 1, wherein the communication protocol is Web Socket.

6. The method of claim 1, wherein the mobile device identifier is selected from the group consisting of a phone number and an email address.

7. The method of claim 1, further comprising:
   determining whether the desktop computer has a session cookie from a previous linking session; and
   responsive to the session cookie from the previous linking session being different from an active session cookie, generating a new session cookie for a current linking session, thereby invalidating the previous linking session.

8. The method of claim 1, further comprising:
   responsive to receiving the send mobile link request, determining whether the desktop computer is currently connected to a communication channel; and
   responsive to determining that the desktop computer is connected to a communication channel, removing from the communication channel any device connected to that communication channel.

9. The method of claim 1, wherein generating the multiple codes comprises:
   determining whether more than a threshold number of codes were generated using the link; and
   responsive to determining that more than the threshold number of codes were generated, invalidating the link.

10. The method of claim 1, further comprising:
    responsive to generating the link, starting an auto-expire timer that, upon reaching a threshold time, causes the link to be invalidated and causes the multiple codes generated by the link to be invalidated.

11. The method of claim 10, further comprising:
    responsive to receiving an indication that the link was activated, resetting the auto-expire timer.

12. The method of claim 1, further comprising:
    preventing more than one mobile device from communicating over the communication channel.

13. The method of claim 1, further comprising:
    responsive to determining that the mobile device is being actively used, preventing the desktop computer from logging off.

* * * * *